United States Patent
Nishijima

(10) Patent No.: US 8,036,487 B2
(45) Date of Patent: Oct. 11, 2011

(54) IMAGE PROCESSING METHOD, APPARATUS AND PROGRAM AS WELL AS IMAGING APPARATUS

(75) Inventor: Masakazu Nishijima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 929 days.

(21) Appl. No.: 12/007,896

(22) Filed: Jan. 16, 2008

(65) Prior Publication Data

US 2008/0285884 A1  Nov. 20, 2008

(30) Foreign Application Priority Data

Jan. 18, 2007  (JP) .................... 2007-009556

(51) Int. Cl.
*G06K 9/40* (2006.01)
(52) U.S. Cl. ........ 382/274; 382/167; 382/275; 358/518; 358/3.26; 358/3.27
(58) Field of Classification Search .................. 382/260, 382/274, 275; 358/515, 518, 537
See application file for complete search history.

(56) References Cited

U.S. PATENT DOCUMENTS

| | | | |
|---|---|---|---|
| 6,493,468 B1 | 12/2002 | Matsuura | |
| 6,859,565 B2 * | 2/2005 | Baron | 382/275 |
| 6,952,503 B2 | 10/2005 | Matsuura | |
| 7,200,280 B2 * | 4/2007 | Enomoto | 382/275 |
| 7,266,240 B2 * | 9/2007 | Matsuda | 382/167 |
| 7,292,375 B2 * | 11/2007 | Nishida | 358/3.26 |
| 7,327,877 B2 * | 2/2008 | Kita | 382/167 |
| 7,375,854 B2 * | 5/2008 | Hsu et al. | 358/1.9 |
| 7,426,312 B2 * | 9/2008 | Dance et al. | 382/254 |
| 7,564,491 B2 * | 7/2009 | Yoneda et al. | 348/246 |
| 2006/0098108 A1 | 5/2006 | Kurosawa | |

FOREIGN PATENT DOCUMENTS

| | | |
|---|---|---|
| JP | 11-317873 | 11/1999 |
| JP | 2002-118857 | 4/2002 |
| JP | 2006-135708 | 5/2006 |

* cited by examiner

*Primary Examiner* — Yosef Kassa
(74) *Attorney, Agent, or Firm* — McGinn IP Law Group, PLLC

(57) ABSTRACT

An image processing method, comprises: an input step of inputting a color digital image; a white balance correction step of correcting white balance of the inputted digital image; an exposure correction step of correcting exposure of the digital image having the corrected white balance; a determination step of determining a pixel in which an output pixel value is saturated without being corrected to be underexposed by the exposure correction, among respective pixels in the digital image having the corrected white balance; and a pixel value correction step of setting only the determined pixel to be saturated as a correction target pixel and correcting the pixel value of the correction target pixel to be more than or equal to the pixel value. Thereby, the color attachment with respect to the blown-out highlight portion can be prevented at the time of the desensitization process.

26 Claims, 17 Drawing Sheets

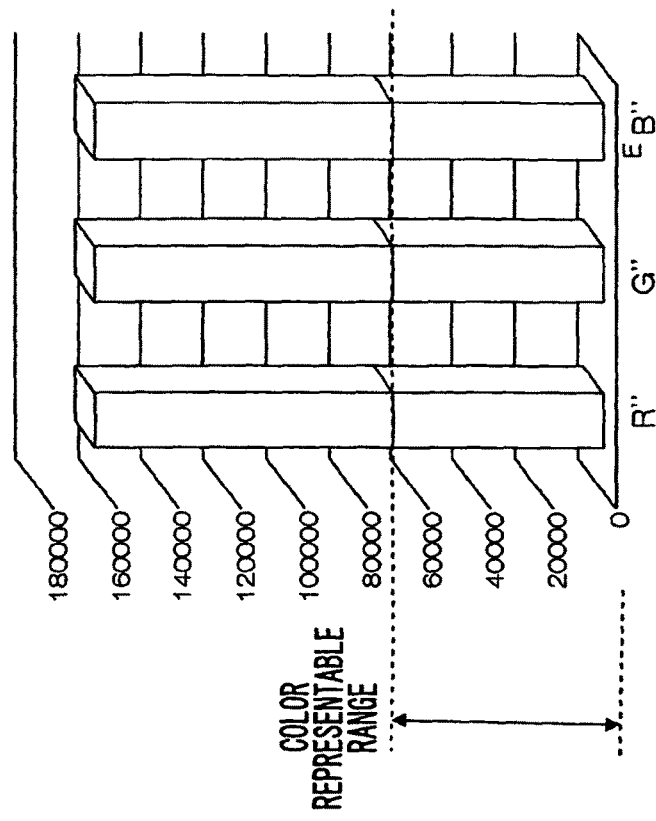
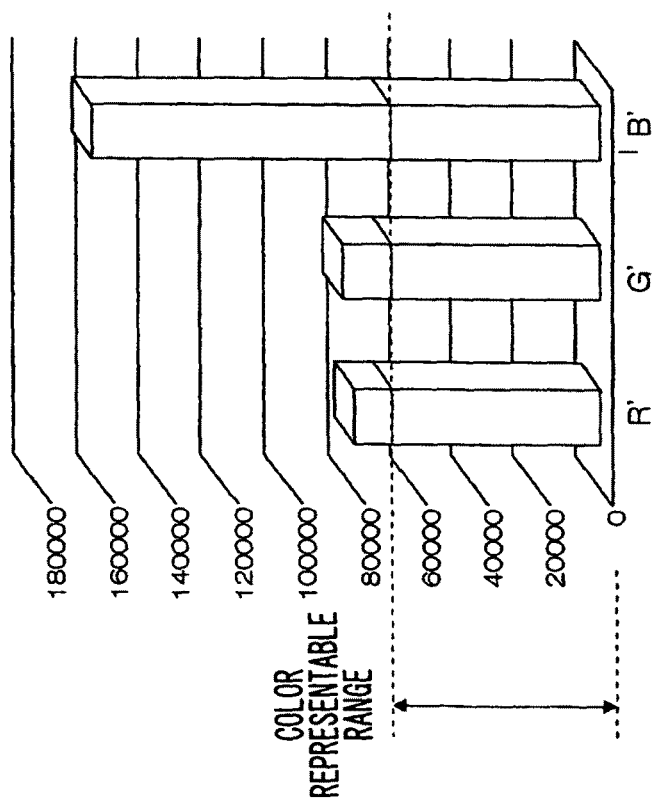

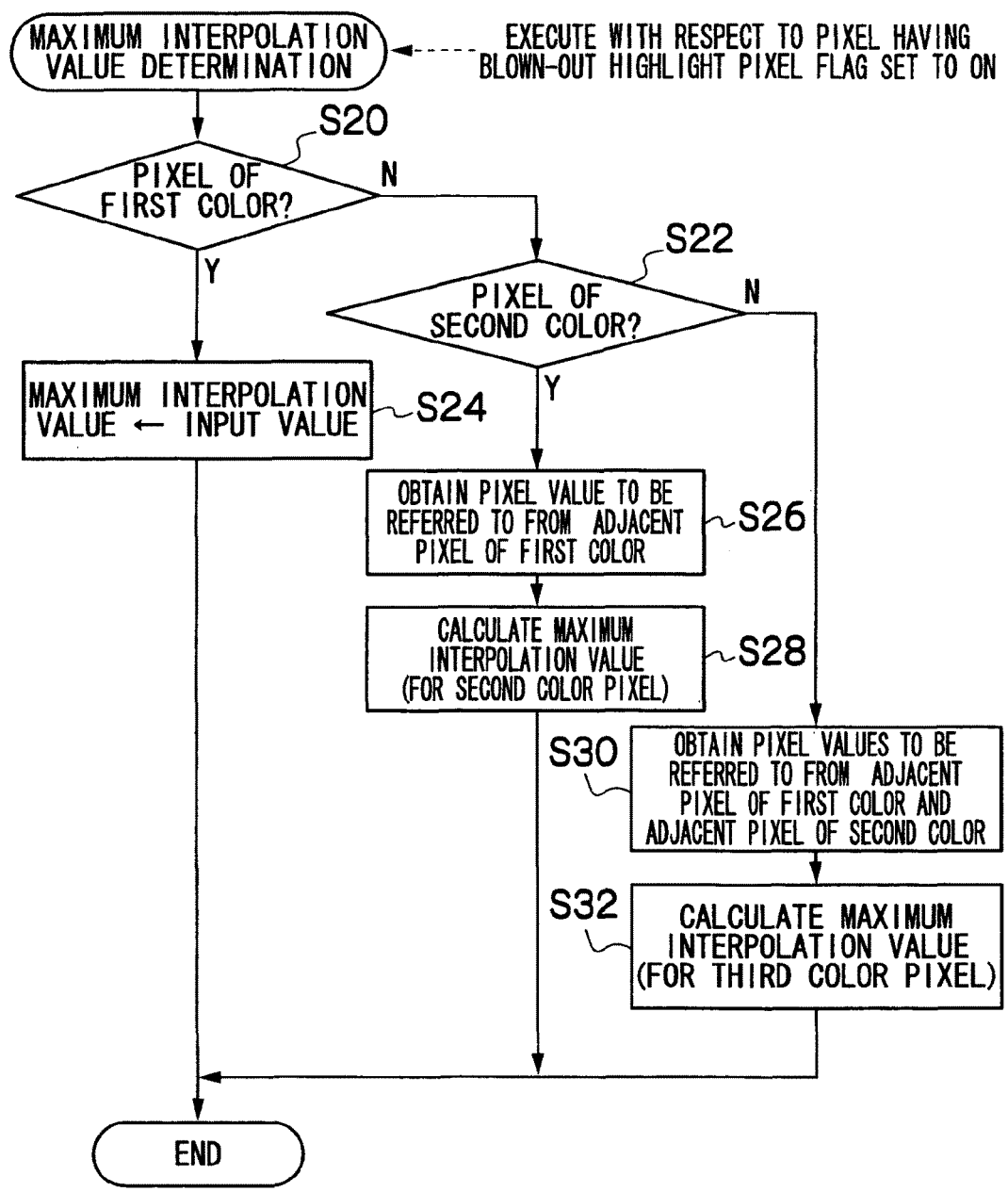

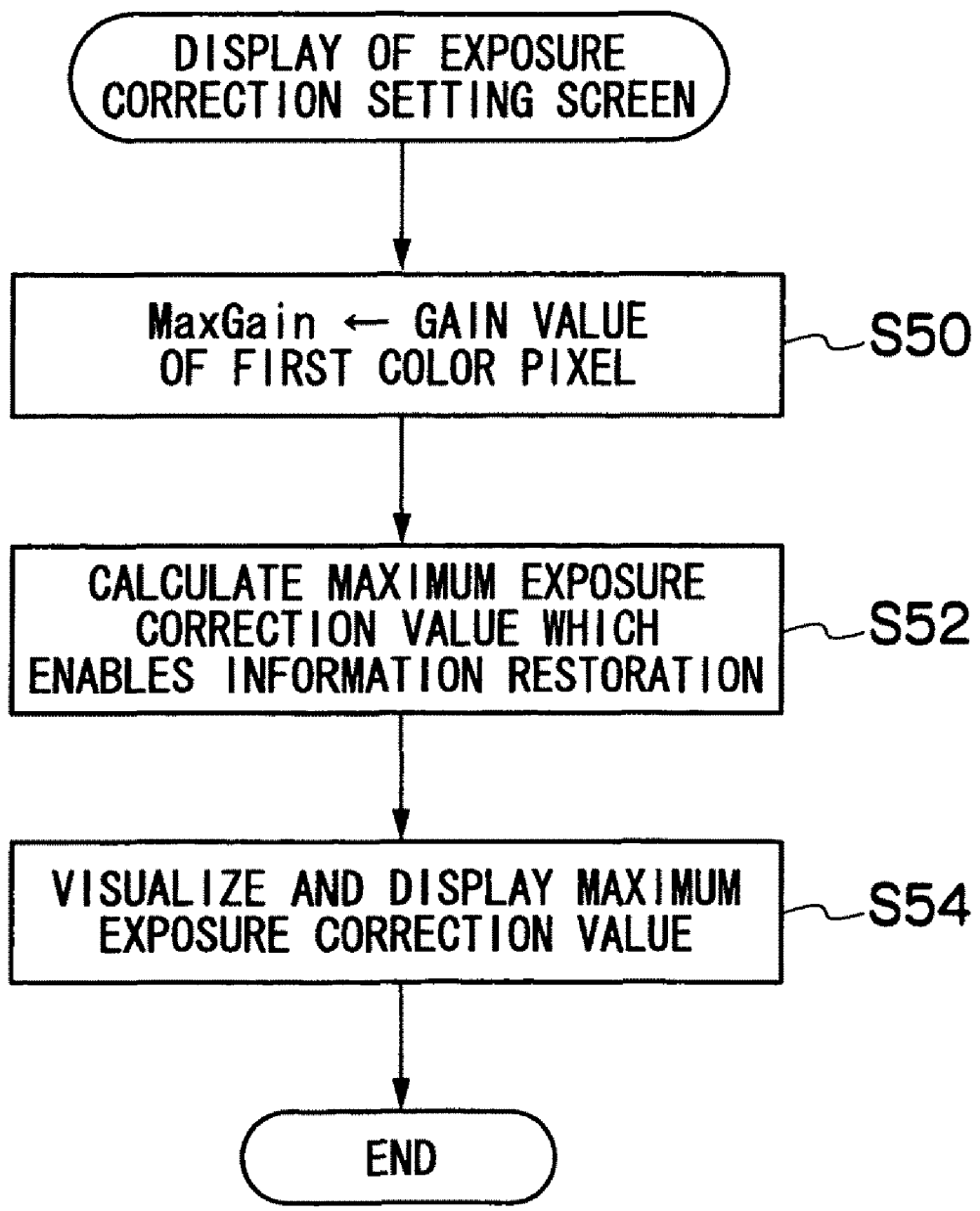

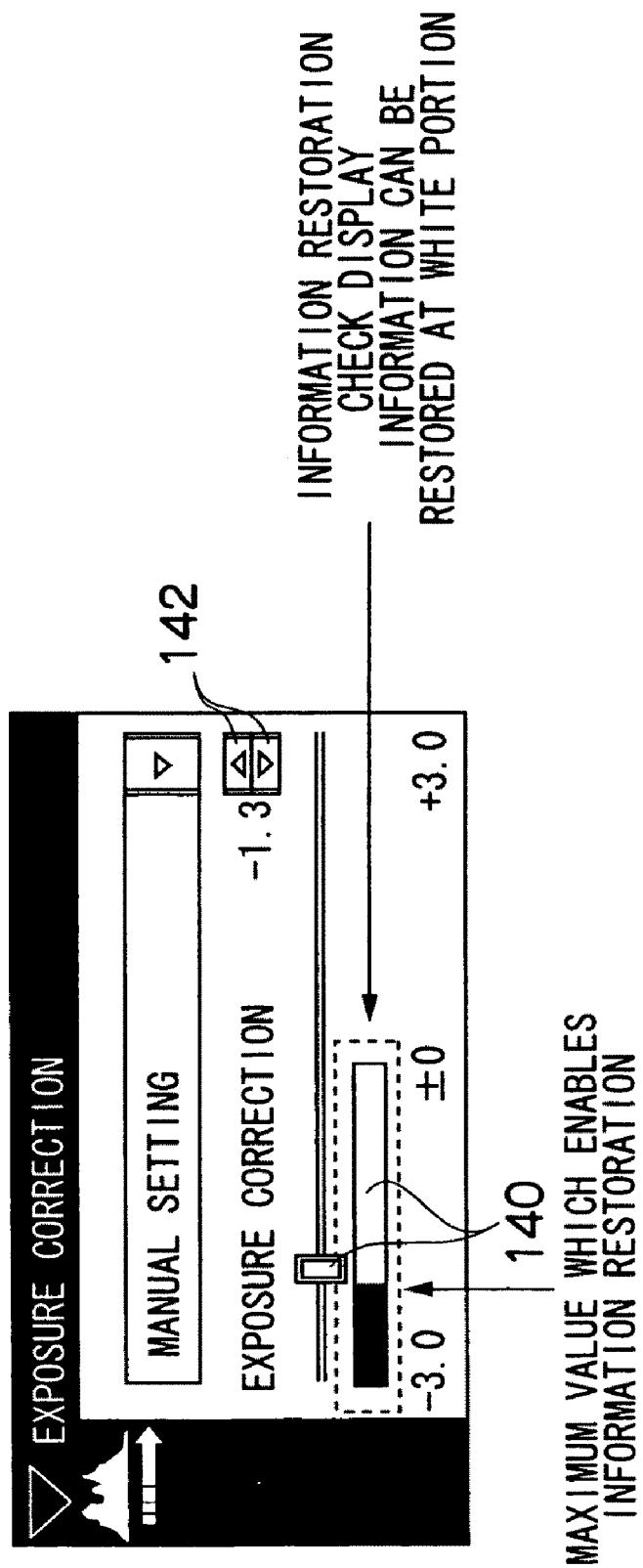

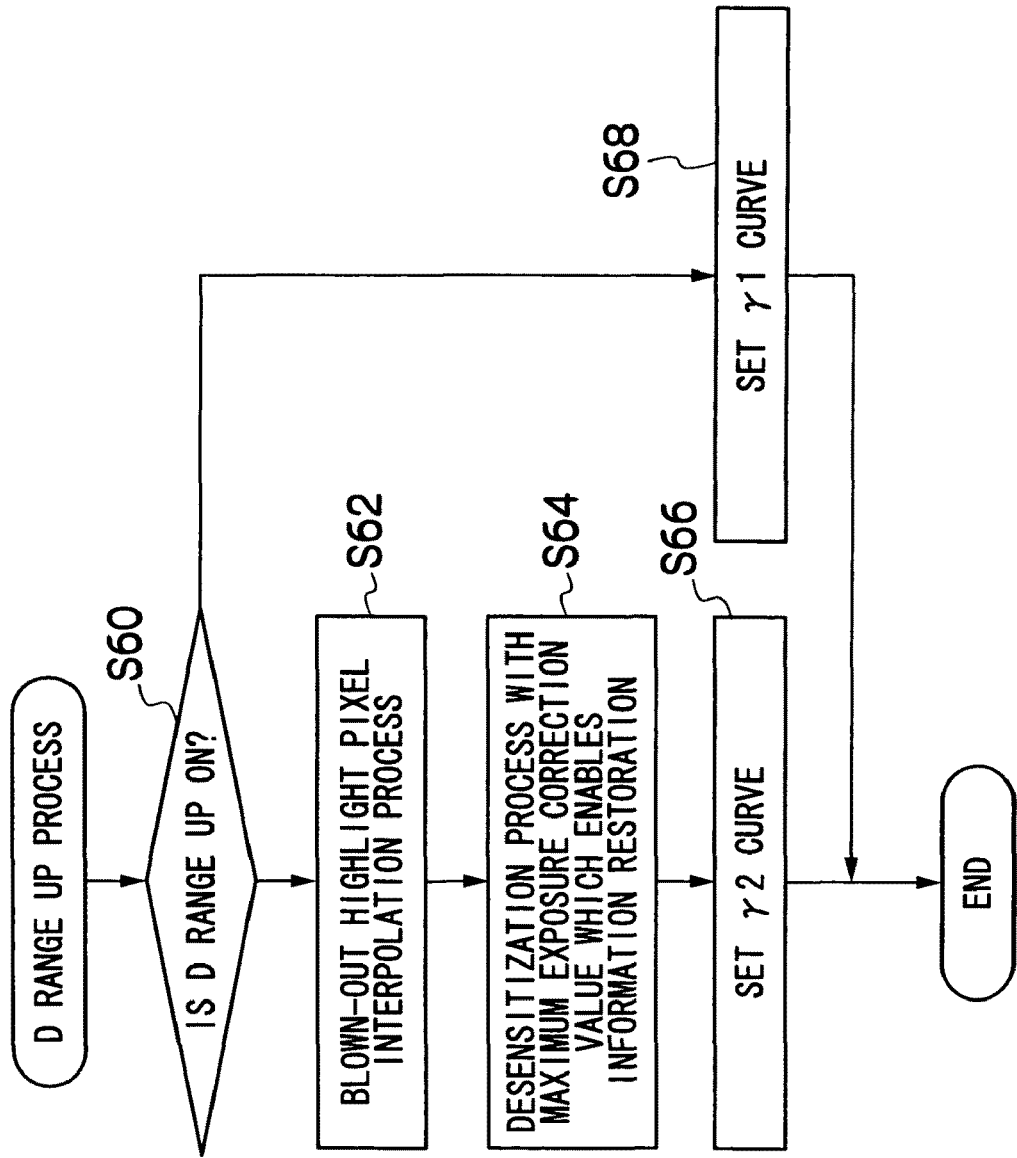

IMAGE PROCESSING METHOD, APPARATUS AND PROGRAM AS WELL AS IMAGING APPARATUS

BACKGROUND OF THE INVENTION

1. Field of the Invention

The present invention relates to an image processing method, apparatus and program, as well as an imaging apparatus, and more particularly, to a technique of preventing color attachment in exposure correction with respect to a digital image.

2. Description of the Related Art

In a RAW file, digital image data (RAW data) in which a light amount captured by an imaging element at the time of shooting with a digital camera has been A/D converted is directly recorded.

In order to output (display or print) the RAW data as an appropriate image, it is necessary to apply various image processes such as white balance correction, exposure correction, gamma correction and a synchronization process. However, at the same time, there is an advantage of great flexibility for a user to correct the image to suit the user's preferences.

For example, when the RAW data is multiplied by R, G and B gains by the white balance correction, even a non-blown-out highlight portion in which highlight is not blown out (less than or equal to a maximum value of a digital value which can be outputted) in the RAW data may be blown out highlight. However, information on a blown-out highlight portion can be restored by setting exposure to be underexposed and performing development (which is a desensitization process).

Japanese Patent Application Laid-Open No. 11-317873 describes an image correction apparatus which uses a value of a highlight portion and a value of a shadow portion in image data obtained by analyzing an image, to perform the exposure correction.

When the white balance correction is performed, luminance varies accordingly. Japanese Patent Application Laid-Open No. 2002-118857 describes a white balance adjustment apparatus which calculates a correction gain for correcting the luminance variation as at least two color gains among the R, G and B gains, and adjusts white balance with the at least two color correction gains which have been calculated.

Japanese Patent Application Laid-Open No. 2006-135708 describes a digital camera which controls a charge storage time of an imaging element independently for each color according to a white balance correction value to prevent a gain (noise) of a particular color signal from being too large.

Incidentally, as described above, even in the digital image including the blown-out highlight due to the white balance correction, the information on the blown-out highlight portion can be restored by performing the desensitization process. However, on the portion in which highlight is blown out due to the white balance correction (blown-out highlighting portion), blown-out amounts are not uniform for each of R, G and B. Therefore, when the desensitization process is performed with respect to this portion, there is a problem that undesirable color is attached to the blown-out highlight portion.

On the other hand, if the desensitization process is performed while preventing the undesirable color from attaching to the blown-out highlight portion, there is a problem that an exposure amount in which the desensitization process can be applied (a restorable width) is decreased.

With respect to this, the image correction apparatus according to Japanese Patent Application Laid-Open No. 11-317873 is applied in a range of a pixel value which has not blown-out highlight at the time of normal exposure, and therefore, the color attachment with respect to the blown-out highlight portion cannot be prevented at the time of the exposure correction.

Similarly, the white balance adjustment apparatus according to Japanese Patent Application Laid-Open No. 2002-118857 equally applies corrected correction gains to all pixels, and therefore, the color attachment with respect to the blown-out highlight portion cannot be prevented at the time of the exposure correction. Moreover, in the digital camera according to Japanese Patent Application Laid-Open No. 2006-135708, when the white balance of the digital image shot with the above described camera is changed after the shooting, maximum gain values of respective colors which have been equal become uneven, and consequently, there is a problem in which the color attachment with respect to the blown-out highlight portion cannot be prevented at the time of the exposure correction.

SUMMARY OF THE INVENTION

The present invention has been made in view of the above described circumstances, and it is an object of the present invention to provide an image processing method, apparatus and program, as well as an imaging apparatus which can solve a problem of undesirable color attachment with respect to a blown-out highlight portion, which occurs at the time of exposure correction (desensitization process) after white balance correction with respect to an inputted digital image, and also can increase a width (the number of levels) in which desensitization correction can be performed.

In order to achieve the above described object, an image processing method according to a first aspect of the present invention comprises: an input step of inputting a color digital image; a white balance correction step of correcting white balance of the inputted digital image; an exposure correction step of correcting exposure of the digital image having the corrected white balance; a determination step of determining a pixel in which an output pixel value is saturated without being corrected to be underexposed by the exposure correction, among respective pixels in the digital image having the corrected white balance; and a pixel value correction step of setting the pixel determined to be saturated as a correction target pixel and correcting the pixel value of the correction target pixel to be more than or equal to the pixel value.

Since the pixel which is saturated (blown-out highlight) at the time of the white balance correction is set as the correction target pixel, color information on an original image can be retained as much as possible. Also, with respect to the correction target pixel which has blown-out highlight, the pixel value of the correction target pixel is corrected to be more than or equal to the pixel value, and thereby, the undesirable color attachment with respect to the blown-out highlight portion can be prevented at the time of the desensitization process.

According to a second aspect of the present invention, in the image processing method according to the first aspect, at the pixel value correction step, the pixel value of the correction target pixel is corrected to a maximum pixel value among the pixel value of the correction target pixel and pixel values of different color pixels surrounding the correction target pixel. Thereby, the pixel value of the correction target pixel can be matched with the pixel values of respective colors, which can prevent the color attachment with respect to the blown-out highlight portion at the time of the desensitization process. Moreover, since the surrounding different color pixels are referred to, reproduction in significantly wrong colors can be prevented, and that in natural colors can be obtained.

According to a third aspect of the present invention, in the image processing method according to the first aspect, the pixel value correction step comprises: a step of obtaining, with respect to the pixel value of the correction target pixel, a maximum interpolation value which is more than or equal to the pixel value; and an interpolation process step of performing an interpolation process with respect to the pixel value of the correction target pixel and the maximum interpolation value to calculate an interpolation value, and the pixel value of the correction target pixel is corrected to the calculated interpolation value.

According to a fourth aspect of the present invention, in the image processing method according to the third aspect, at the step of obtaining the maximum interpolation value, the maximum interpolation value is obtained with reference to pixel values of different color pixels surrounding the correction target pixel. Since the surrounding different color pixels are referred to, the reproduction in the significantly wrong colors is prevented, and that in the natural colors can be obtained.

According to a fifth aspect of the present invention, in the image processing method according to the third aspect, a pixel in the digital image of a color corresponding to a maximum gain value among gain values of R, G and B to be used in the white balance correction at the white balance correction step is set as a pixel of a first color, a pixel in the digital image of a color corresponding to a second largest gain value is set as a pixel of a second color, and a pixel in the digital image of a color corresponding to a smallest gain value is set as a pixel of a third color, and at the step of obtaining the maximum interpolation value, with respect to the pixel of the first color, the pixel value of the pixel of the first color is obtained as the maximum interpolation value, and with respect to the pixel of the second color, the maximum interpolation value is obtained with reference to the pixel values of the pixels of the first color surrounding the pixel of the second color, and with respect to the pixel of the third color, the maximum interpolation value is obtained with reference to the pixel values of the pixels of the first color and the second color surrounding the pixel of the third color, respectively.

Thereby, with respect to the pixel of the first color, the pixel value of the pixel of the first color matches the maximum interpolation value, and therefore, the pixel value of the pixel of the first color is not corrected. With respect to the pixel of the second color, the maximum interpolation value is obtained with reference to the pixel value of the pixel of the first color, and with respect to the pixel of the third color, the maximum interpolation value is obtained with reference to the pixel values of the pixels of the first color and the second color, respectively.

According to a sixth aspect of the present invention, in the image processing method according to any of the third to fifth aspects, at the interpolation process step, the interpolation value is calculated, by the interpolation process, to be closer to the maximum interpolation value obtained with respect to the correction target pixel as the pixel value of the pixel is larger. That is, the interpolation value is calculated by performing the interpolation process so that the larger the pixel value of the correction target pixel is, the more the interpolation value approaches the maximum interpolation value which has been obtained with respect to the pixel. Since the interpolation value is adjusted depending on the pixel value of the correction target pixel, it is possible to avoid unnecessary blown-out tone and obtain the natural colors.

According to a seventh aspect of the present invention, in the image processing method according to any of the first to sixth aspects, if an exposure correction value at the exposure correction step is more than or equal to 0, the pixel value of the correction target pixel is not corrected by the pixel value correction step. In other words, if the exposure correction value is less than 0 (zero) (at the time of the desensitization process), the undesirable color attachment occurs at the blown-out highlight portion. Therefore, the pixel value of the correction target pixel is not corrected if the desensitization process is not performed (at the time of normal exposure or a sensitization process).

An image processing method according to an eighth aspect of the present invention includes: an input step of inputting a color digital image; a white balance correction step of correcting white balance of the inputted digital image; an exposure correction step of correcting exposure of the digital image having the corrected white balance, depending on an exposure correction value which has been manually set; a step of calculating a maximum exposure correction value which enables information restoration, at the time of the exposure correction at the exposure correction step, based on gain values of R, G and B used in the white balance correction at the white balance correction step; and a step of visibly displaying a relationship between the maximum exposure correction value and the exposure correction value which is currently set, on a display device.

Thereby, if the exposure correction is performed with a manual operation, the exposure correction can be performed with reference to the maximum exposure correction value which enables information restoration, which improves operability. In addition, a more effective maximum exposure correction value can be obtained by performing the image processing method according to the eighth aspect, simultaneously with the image processing method according to any of the first to seventh aspects.

An image processing method according to a ninth aspect of the present invention includes: an input step of inputting a color digital image; a white balance correction step of correcting white balance of the inputted digital image; an exposure correction step of correcting exposure of the digital image having the corrected white balance to be underexposed so that the digital image having the corrected white balance is not saturated; and a gamma correction step of performing gamma correction for a wide dynamic range with respect to the digital image corrected to be underexposed, in which tone correction is performed to make a halftone larger than the halftone in normal gamma correction and also the tone correction is performed to compress a high luminance portion. Thereby, it is possible to obtain the image which is bright similarly to the normal exposure and has been subjected to the white balance correction, without the blown-out highlight (image with the wide dynamic range). In addition, the undesirable color attachment with respect to the high luminance portion can be prevented by performing the image processing method according to the ninth aspect, simultaneously with the image processing method according to any of the first to seventh aspects.

According to a tenth aspect of the present invention, in the image processing method according to the ninth aspect, the exposure correction step comprises a step of calculating a maximum exposure correction value which enables information restoration, for the digital image having the corrected white balance, based on a maximum value among gain values of R, G and B used in the white balance correction, and the exposure of the digital image having the corrected white balance is corrected depending on this maximum exposure correction value.

According to an eleventh aspect of the present invention, in the image processing method according to the eighth or tenth aspect, when the maximum value among the gain values of R, G and B used in the white balance correction is MaxGain, the step of calculating the maximum exposure correction value calculates a maximum exposure correction value MaxEV which enables the information restoration, by a next formula: $MaxEV=LOG_2(1/MaxGain)$.

According to a twelfth aspect of the present invention, the image processing method according to any of the eighth to eleventh aspects further includes: a determination step of determining a pixel whose an output pixel value is saturated without being corrected to be underexposed by the exposure correction, among respective pixels in the digital image having the corrected white balance; and a pixel value correction step of setting the pixel whose pixel value is determined to be saturated as a correction target pixel and correcting the pixel value of the correction target pixel to be more than or equal to the pixel value.

An image processing apparatus according to a thirteenth aspect of the present invention includes: an input device which inputs a color digital image; a white balance correction device which corrects white balance of the inputted digital image; an exposure correction device which corrects exposure of the digital image having the corrected white balance; a determination device which determines a pixel whose an output pixel value is saturated without being corrected to be underexposed by the exposure correction, among respective pixels in the digital image having the corrected white balance; and a pixel value correction device which sets the pixel whose pixel value is determined to be saturated as a correction target pixel and corrects the pixel value of the correction target pixel to be more than or equal to the pixel value.

An image processing apparatus according to a fourteenth aspect of the present invention includes: an input device which inputs a color digital image; a white balance correction device which corrects white balance of the inputted digital image; an exposure correction device which corrects exposure of the digital image having the corrected white balance, depending on an exposure correction value which has been manually set; a device which calculates a maximum exposure correction value which enables information restoration, at the time of the exposure correction at the exposure correction device, based on gain values of R, G and B used in the white balance correction at the white balance correction device; and a device which visibly displays a relationship between the maximum exposure correction value and the exposure correction value which is currently set, on a display device.

An image processing apparatus according to a fifteenth aspect of the present invention includes: an input device which inputs a color digital image; a white balance correction device which corrects white balance of the inputted digital image; an exposure correction device which corrects exposure of the digital image having the corrected white balance to be underexposed so that the digital image having the corrected white balance is not saturated; and a gamma correction device which performs gamma correction for a wide dynamic range with respect to the digital image which has been corrected to be underexposed, in which tone correction is performed to make a halftone larger than the halftone in normal gamma correction and also the tone correction is performed to compress a high luminance portion.

An imaging apparatus according to a sixteenth aspect of the present invention includes an imaging device which images a subject and obtains RAW data showing a color digital image, a recording device which has a function of recording at least the RAW data in a recording medium, and an image processing apparatus according to any of the thirteenth to fifteenth aspects, and is characterized in that the input device inputs the digital image showing the RAW data obtained by the imaging device or the digital image showing the RAW data read from the recording medium.

An image processing program according to a seventeenth aspect of the present invention causes a computer to realize: an input function of inputting a color digital image; a white balance correction function of correcting white balance of the inputted digital image; an exposure correction function of correcting exposure of the digital image having the corrected white balance; a determination function of determining a pixel whose an output pixel value is saturated without being corrected to be underexposed by the exposure correction, among respective pixels in the digital image having the corrected white balance; and a pixel value correction function of setting the determined pixel whose pixel value is saturated as a correction target pixel and correcting the pixel value of the correction target pixel to be more than or equal to the pixel value.

An image processing program according to an eighteenth aspect of the present invention causes a computer to realize: an input function of inputting a color digital image; a white balance correction function of correcting white balance of the inputted digital image; an exposure correction function of correcting exposure of the digital image having the corrected white balance, depending on an exposure correction value which has been manually set; a function of calculating a maximum exposure correction value which enables information restoration, at the time of the exposure correction at the exposure correction function, based on gain values of R, G and B used in the white balance correction at the white balance correction function, and a function of visibly displaying a relationship between the maximum exposure correction value and the exposure correction value which is currently set, on a display device.

An image processing program according to a nineteenth aspect of the present invention causes a computer to realize: an input function of inputting a color digital image; a white balance correction function of correcting white balance of the inputted digital image; an exposure correction function of correcting exposure of the digital image having the corrected white balance to be underexposed so that the digital image having the corrected white balance is not saturated; and a gamma correction function of performing gamma correction for a wide dynamic range with respect to the digital image corrected to be underexposed, in which tone correction is performed to make a halftone larger than the halftone in normal gamma correction and also the tone correction is performed to compress a high luminance portion.

According to the present invention, since only the pixel which has blown-out highlight in the white balance correction with respect to the inputted digital image is set as the correction target pixel, the color information on the original image can be retained as much as possible. Also, with respect to the correction target pixel which has blown-out highlight, the pixel value of the correction target pixel is corrected to be more than or equal to the pixel value, and thereby, the undesirable color attachment with respect to the blown-out highlight portion can be prevented at the time of the desensitization process. Moreover, it is possible to increase the width (the number of levels) in which the desensitization correction can be performed.

BRIEF DESCRIPTION OF THE DRAWINGS

FIGS. 8A and 8B are diagrams used for describing the correction of the pixel value of the correction target pixel according to an embodiment of the present invention;

FIG. 9 is a flowchart showing a method of determining a maximum interpolation value;

FIG. 14 is a flowchart showing a third embodiment of the image processing method according to the present invention;

FIG. 15 is a diagram showing an example of an operation screen displayed on a monitor device when exposure correction is manually set;

FIG. 16 is a flowchart showing a fourth embodiment of the image processing method according to an embodiment of the present invention.

DETAILED DESCRIPTION OF THE PREFERRED EMBODIMENTS

Preferred embodiments of an image processing method, apparatus and program as well as an imaging apparatus according to the present invention will be described below according to the accompanying drawings.

Imaging Apparatus

Figure 1:
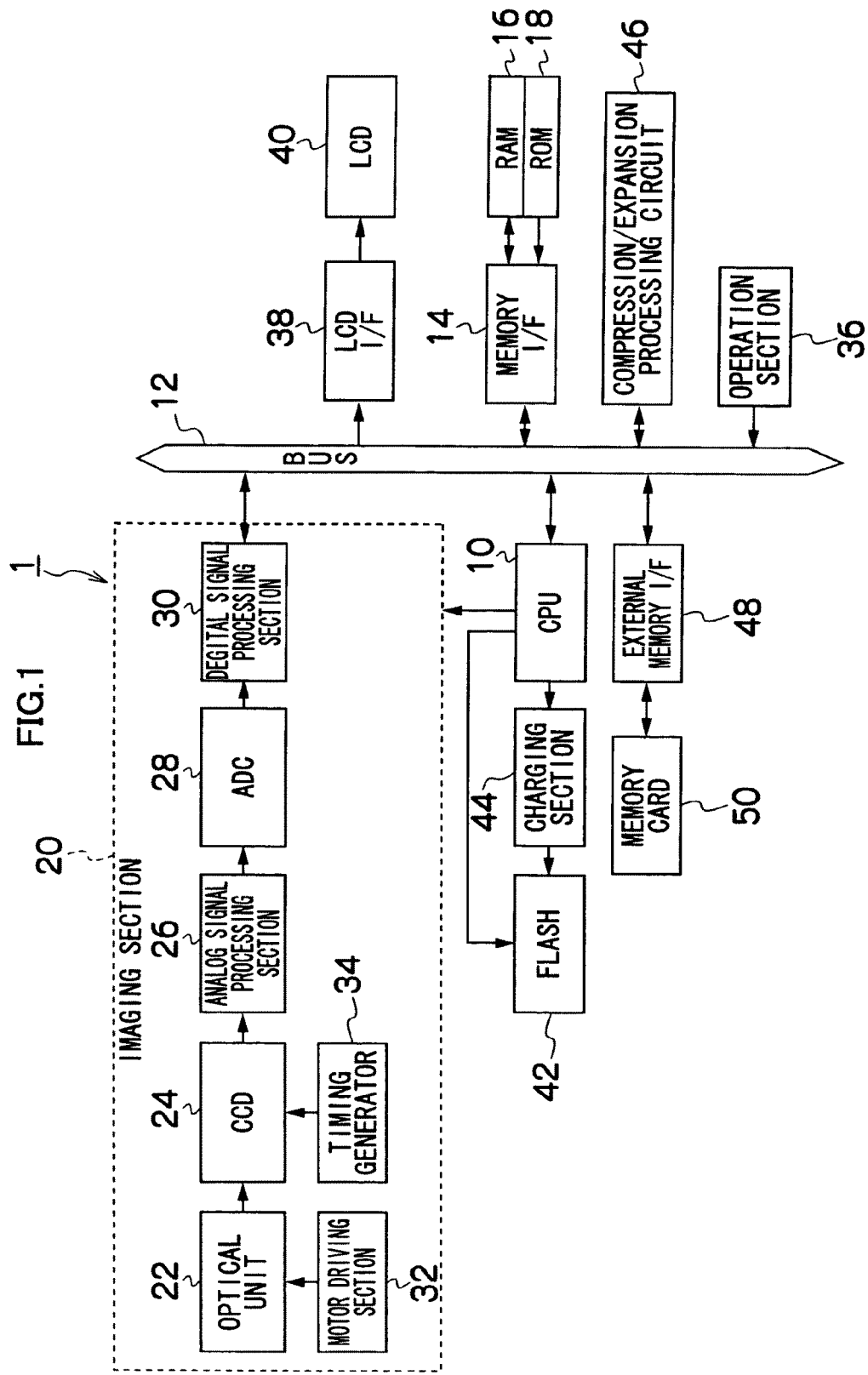
FIG. 1 is a block diagram showing an imaging apparatus (camera) according to embodiments of the present invention.

FIG. 1 is a block diagram showing an imaging apparatus according to embodiments of the present invention.

An imaging apparatus (hereinafter referred to as "camera") 1 shown in FIG. 1 is a digital camera provided with functions of recording and replaying still images or moving images, and operations of the entire camera are controlled in an integrated manner by a central processing unit (CPU) 10. The CPU 10 functions as a control device which controls this camera system according to a predetermined program, and also functions as a calculation device which performs various calculations such as an automatic exposure (AE) calculation, an automatic focus adjustment (AF) calculation and a white balance (WB) adjustment calculation, etc.

A RAM (Random Access Memory) 16 and a ROM (Read Only Memory) 18 are connected to the CPU 10 via a bus 12 and a memory interface 14. The RAM 16 is used as a program expansion area and a calculation working area for the CPU 10, and is also used as a temporary storage area for image data. In the ROM 18, various data required for the program and the control executed by the CPU 10, various constants/information related to the camera operations and the like are stored.

An imaging section 20 includes an optical unit 22 including a shooting lens, an aperture and the like, a CCD imaging element 24 (hereinafter simply referred to as "CCD") and the like. In the optical unit 22, a focus lens, the aperture and the like are driven via a motor driving section 32 according to an AF instruction or an AE instruction from the CPU 10.

Figure 2:
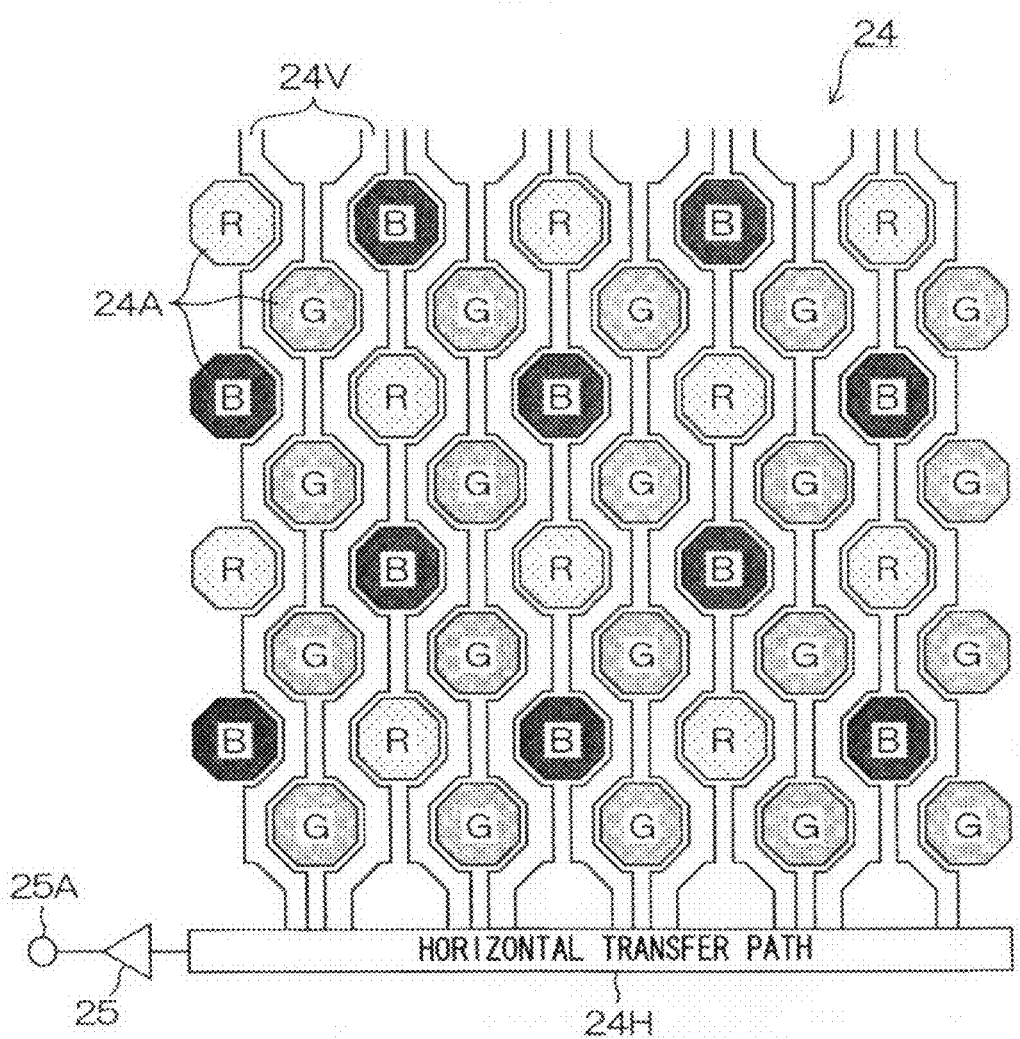
FIG. 2 is a diagram showing a configuration example of a CCD imaging element.

As shown in FIG. 2, the CCD 24 is a CCD type two-dimensional imaging device (image sensor) in which multiple light receiving elements (photodiodes) 24A are arranged at a certain array period in a horizontal direction (row direction) and a vertical direction (column direction). A shown configuration is a pixel array referred to as "honeycomb array", and light receiving elements 24A are arrayed so that a center point of a geometric shape is shifted by half a pixel pitch (½ pitch) in the row direction and the column direction every other light receiving element 24A.

Each light receiving element 24A has an octagonal light receiving surface, and R, G and B primary color filters are arranged to correspond with the respective light receiving elements 24A. In an array pattern as shown in FIG. 2, a row of GGGG . . . is arranged at a next level of a row of RBRB . . . and a row of BRBR . . . is arranged at a next level of the row of GGGG . . . in the horizontal direction, and a column of RBRB . . . , a column of GGGG . . . and a column of BRBR . . . are cyclically repeated in the column direction.

A vertical transfer path (VCCD) 24V is formed on the right side (or the left side) of each light receiving element 24A. The vertical transfer path 24V extends in the vertical direction while the vertical transfer path 24V meanders in a zigzag manner in proximity to each column of the light receiving elements 24A, avoiding the light receiving elements 24A. Although not shown, on the vertical transfer path 24V, transfer electrodes required for 4-phase driving ($\phi 1$, $\phi 2$, $\phi 3$ and $\phi 4$) are arranged. The transfer electrodes are provided to extend in the horizontal direction of FIG. 2 while the transfer electrodes meander in proximity to each row of the light receiving elements 24A, avoiding openings of the light receiving elements 24A.

A signal charge generated by photoelectric conversion at each light receiving element 24A is read by the vertical transfer path 24V adjacent to the right side (or the left side) of the above described light receiving element 24A, and transferred downward (in a V direction) in FIG. 2 according to a transfer pulse.

In FIG. 2, at a lower end of the vertical transfer path 24V (at a most downstream side of the vertical transfer path 24V), a horizontal transfer path (HCCD) 24H which transfers the signal charge moved from the vertical transfer path 24V into the horizontal direction is provided.

The horizontal transfer path 24H is configured with a 2-phase or 4-phase driven transfer CCD, and a last level of the horizontal transfer path 24H (a leftmost level on FIG. 2) is connected to an output section 25. The output section 25 includes an output amplifier, performs charge detection for an inputted signal charge, and outputs the signal charge as a signal voltage to an output terminal 25A. In this way, signals generated at the respective light receiving elements 24A are outputted as a dot sequential signal column. It should be noted that the signals outputted from the output terminal 25A becomes a signal column of RGBGRGBG . . . .

Returning to FIG. 1, the CCD 24 has an electronic shutter function of controlling a charge storage time (shutter speed)

of each light receiving element. The CPU 10 controls the charge storage time at the CCD 24 via a timing generator 34.

A CCD signal sequentially read from this CCD 24 is added to an analog signal processing section 26. The analog signal processing section 26 has a CDS circuit, an analog amplifier and the like. The CDS circuit performs a correlated double sampling process with respect to the inputted CCD signal, and the analog amplifier amplifies the CCD signal outputted from the CDS circuit with a shooting sensitivity setting gain added from the CPU 10.

The CCD signal subjected to an analog process at the analog signal processing section 26 is added to an A/D converter 28 in which the CCD signal is converted into digital color image data (RAW data of dot sequential R, G and B) for each pixel.

The RAW data of R, G and B is temporarily stored in the RAM 16 via a digital signal processing section 30, the bus 12 and the memory interface 14. This RAW data of R, G and B is inputted into the digital signal processing section 30 in which the RAW data is applied with image processes such as white balance correction, exposure correction, gamma correction, a synchronization process and an RGB/YC conversion process.

Moreover, if RAW data recording has been selected, the above described RAW data is recorded in a RAW file format in a memory card 50 via an external memory interface 48.

An operation section 36 of the camera 1 includes a shutter button, a mode switching lever for switching between a shooting mode and a playing mode, a mode dial for selecting the shooting mode (an automatic shooting mode, a manual shooting mode, a continuous shooting mode and the like), a menu button which displays a menu screen on a display section (LCD) 40, a multifunction cross key for selecting a desired item from the menu screen, an OK button for confirming the selected item or instructing to execute a process, a BACK button for deleting a desired target such as the selected item, canceling contents of the instruction or inputting an instruction for returning to a previous operation state, and the like. A signal outputted from the operation section 36 is inputted into the CPU 10 via the bus 12, and the CPU 10 causes an appropriate process such as shooting or replaying to be performed based on the signal inputted from the operation section 36.

The camera 1 includes a flash device 42 which illuminates a flashlight to a subject, and according to a light emitting instruction from the CPU 10, the flash device 42 receives power supply from a charging section 44 and illuminates the flashlight.

Image data (a luminance signal Y and color difference signals Cr and Cb) processed at the digital signal processing section 30 is given to a compression/expansion processing circuit 46 in which the image data is compressed according to a predetermined compression format (for example, a JPEG method). The compressed image data is recorded in an image file (for example, a JPEG file) format in the memory card 50 via the external memory interface 48.

Moreover, on the LCD 40, a video (pass-through movie image) is displayed during imaging preparation according to an image signal added via an LCD interface 38, and also, in the replaying mode, the JPEG file or the RAW file recorded in the memory card 50 is read out and an image is displayed. In addition, the compressed image data stored in the JPEG file is subjected to an expansion process by the compression/expansion processing circuit 46 and outputted to the LCD 40, and the RAW data stored in the RAW file is subjected to RAW development by the above described digital signal processing section 30, and subsequently outputted to the LCD 40.

[Image Processing Apparatus]

Figure 3:
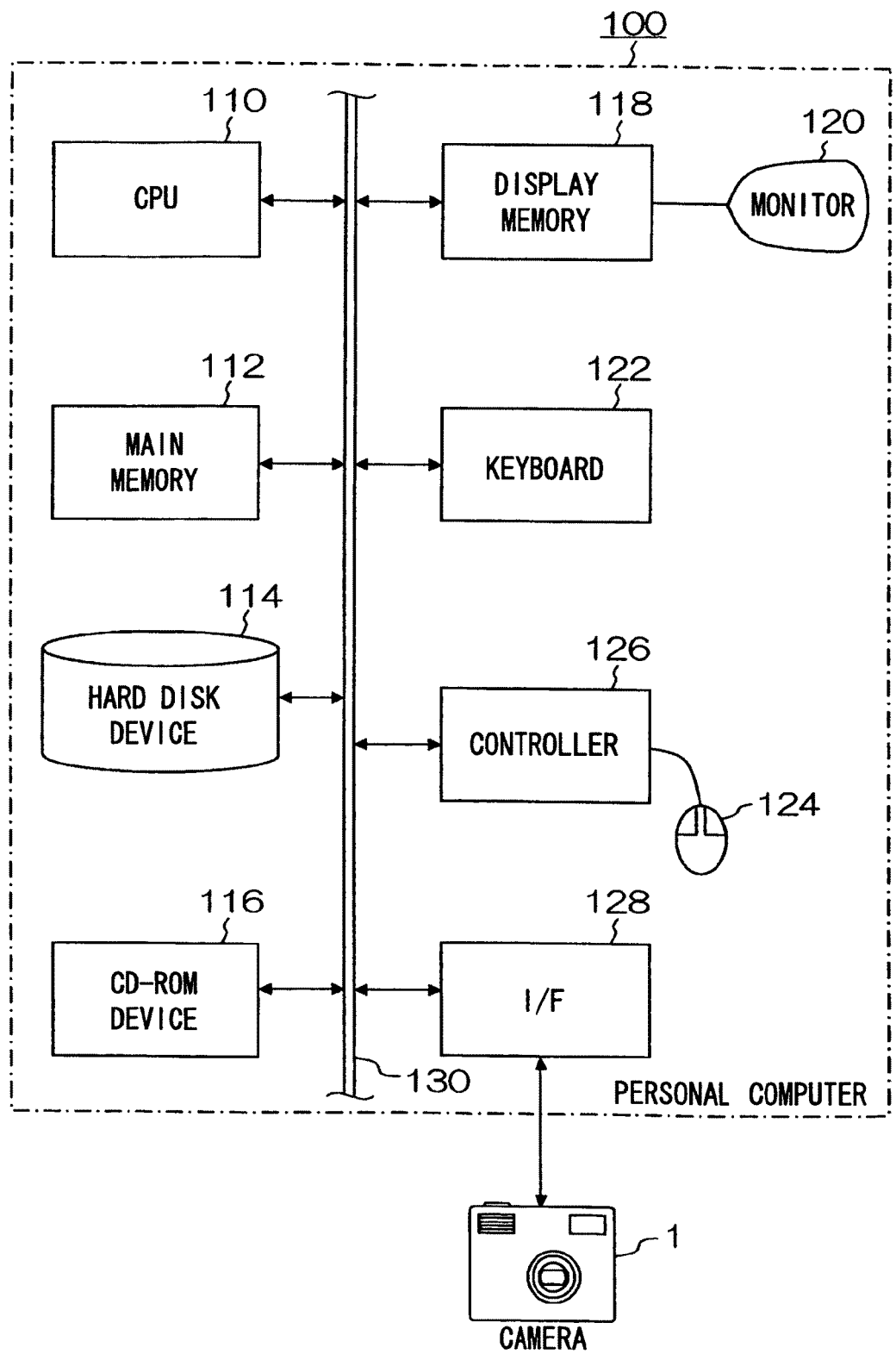
FIG. 3 is a block diagram showing a hardware configuration example of a personal computer provided with a function as an image processing apparatus according to the embodiments of the present invention.

FIG. 3 is a block diagram showing a hardware configuration example of a personal computer provided with a function as an image processing apparatus according to the embodiments of the present invention.

As shown in FIG. 3, a personal-computer 100 is configured with a central processing unit (CPU) 110 which mainly controls operations of respective components, a main memory 112 which stores a control program for the apparatus and becomes a working area when the program is executed, a hard disk device 114 in which an operating system (OS) for the personal computer 100, a device driver of a peripheral device connected to the personal computer 100, various application software including an image processing program according to the embodiments of the present invention, a user's images and the like are stored, a CD-ROM device 116, a display memory 118 which temporarily stores data to be displayed, a monitor device 120 such as a CRT monitor or an LCD monitor which displays the images, characters and the like based on image data, character data and the like from this display memory 118, a keyboard 122, a mouse 124 as a position input device, a mouse controller 126 which detects a state of the mouse 124 and outputs signals for a position of a mouse pointer on the monitor device 120, the state of the mouse 124 and the like to the CPU 110, an interface 128 such as a USB (Universal Serial Bus) capable of connecting to the camera 1 and inputting the RAW file and the like, and a bus 130 which connects the above described respective components to one another.

In addition, the personal computer 100 configured as described above is well known except the image processing program according to the embodiments of the present invention stored in the hard disk device 114, and therefore, detailed descriptions of the respective components are omitted. This image processing program can be installed in the personal computer 100 by setting a CD-ROM in which the above described image processing program has been recorded (a CD-ROM supplied with the camera 1) into the CD-ROM device 116 of the personal computer 100. Moreover, the image processing program can be downloaded through a network which is not shown in the figure.

Moreover, the RAW file recorded in the memory card 50 of the camera 1 can be captured in the hard disk device 114 via a card reader which is not shown in the figure.

Next, an image process (RAW development) in which the RAW data in the RAW file captured in the hard disk device 114 is visualized based on the image processing program will be described.

[RAW Development]

Figure 4:
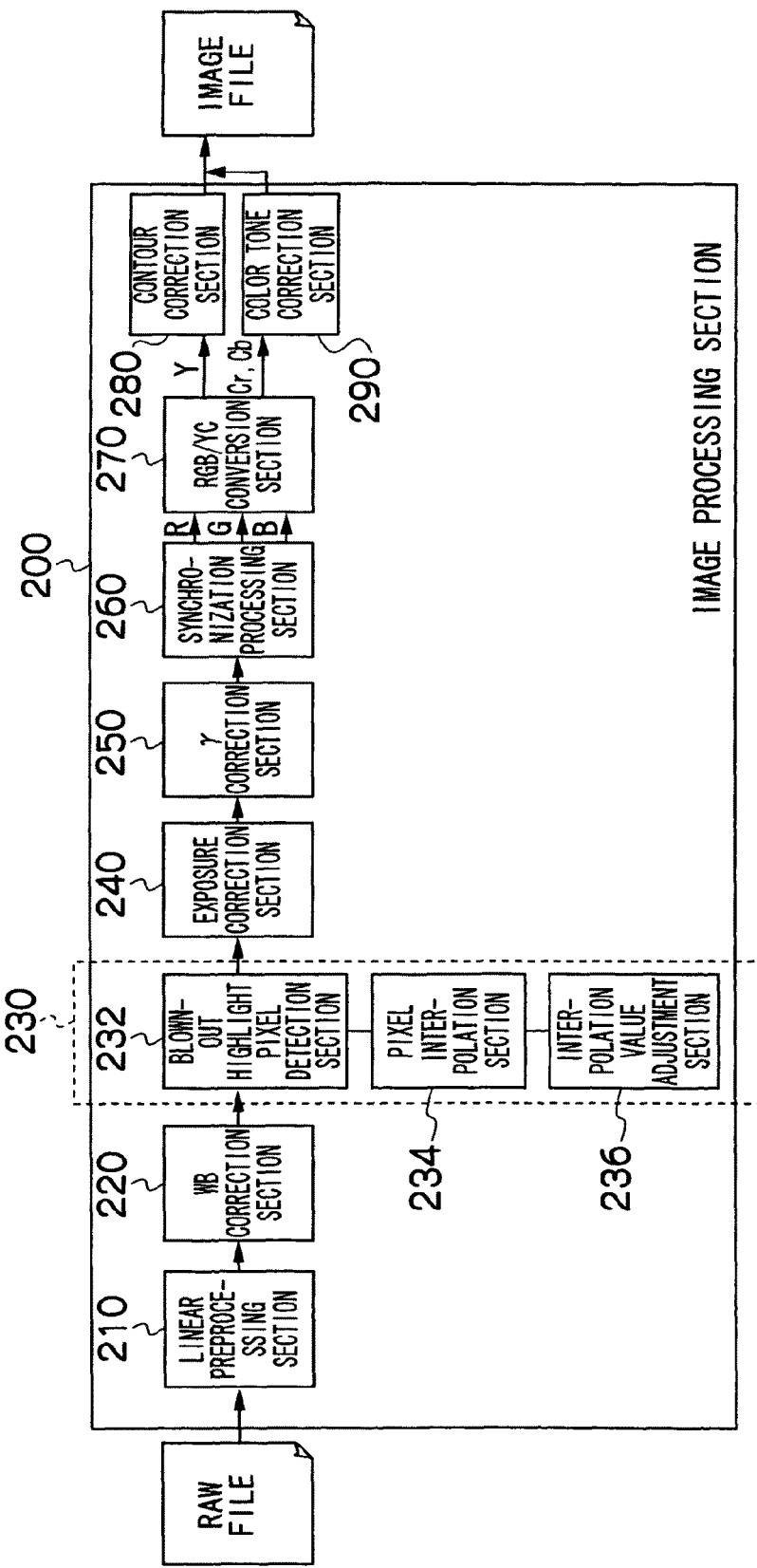
FIG. 4 is a functional block diagram showing contents of a process in an image processing program according to the embodiments of the present invention.

FIG. 4 is a functional block diagram showing contents of a process in the image processing program according to the present invention.

When the process of the RAW development with respect to a desired RAW file among the RAW files captured in the hard disk device 114 is instructed, the RAW data (data having a 14-bit length for each of R, G and B) in the RAW file is temporarily stored in the main memory 112.

The 14-bit RAW data of R, G and B which has been temporarily stored in the main memory 112 is added in an RGB dot sequential manner to a linear preprocessing section 210 in an image processing section 200. In the RAW data of R, G and B, preprocesses such as offset adjustment, 16-bit conversion and shading correction are performed with respect to linear data at the linear preprocessing section 210.

The R, G and B data outputted from the linear preprocessing section 210 is outputted to a white balance (WB) correction section 220. The WB correction section 220 performs the white balance correction by multiplying each of the R, G and B data by gain values for the white balance correction Rg, Gg and Bg, respectively.

Here, the RAW data is analyzed, and for example, a light source type (sunlight, fluorescent light, tungsten bulb and the like) is identified, and then the gain values for the white balance correction Rg, Gg and Bg are set to gain values Rg, Gg and Bg which have been previously stored corresponding to the light source type. Alternatively, the gain values for the white balance correction Rg, Gg and Bg are set to gain values Rg, Gg and Bg corresponding to the light source type or a color temperature which has been manually selected on the menu screen for performing the white balance correction. In addition, since the 16-bit R, G and B data is multiplied by the gain values Rg, Gg and Bg in this embodiment, the R, G and B data may become larger than 16 bits. Therefore, in the personal computer 100, the process is performed in 32 bits which is larger than 16 bits.

The R, G and B data outputted from the WB correction section 220 is added to a pixel value correction section 230. This pixel value correction section 230 is a portion added by the present invention, which sets only a blown-out highlight pixel (a pixel which is blown-out highlight) as a correction target pixel and corrects a pixel value of the correction target pixel to be more than or equal to the pixel value. It should be noted that the process in this pixel value correction section 230 will be described in detail later.

The R, G and B data outputted from the pixel value correction section 230 is added to an exposure correction section 240. The exposure correction section 240 corrects exposure to be underexposed (desensitization process) or overexposed (sensitization process) with respect to normal exposure (exposure in the case of not being subjected to the exposure correction) depending on a manually inputted instruction for an exposure correction value (for example, −3 EV to +3 EV).

The R, G and B data outputted from the exposure correction section 240 is outputted to a gamma correction section 250 in which the linear data is converted into tone data of a color space such as sRGB, AdobeRGB or scRGB. The R, G and B data subjected to the gamma correction is outputted to a synchronization processing section 260.

The synchronization processing section 260 performs a process of interpolating spatial shifts in the R, G and B data which are associated with the CCD color filter array of the CCD 24 shown in FIG. 2, and converting the R, G and B data into synchronous data, and outputs the synchronized R, G and B data to an RGB/YC conversion section 270.

The RGB/YC conversion section 270 converts the R, G and B data into luminance data Y and color difference data Cr and Cb, outputs the luminance data Y to a contour correction section 280 and outputs the color difference data Cr and Cb to a color tone correction section 290. The contour correction section 280 performs a process of emphasizing a contour portion (a portion with a large luminance change) in the luminance data Y.

The color tone correction section 290 performs a matrix calculation of the inputted color difference signals Cr and Cb and a color correction matrix coefficient of 2 rows×2 columns, and performs color correction to realize good color reproducibility. The color correction matrix coefficient is appropriately changed depending on a color correction instruction inputted by the user.

The luminance data Y subjected to contour correction in this way and the color difference data Cr and Cb subjected to color tone correction in this way are stored as the JPEG file or a TIFF file when an image storage instruction is inputted.

[Pixel Value Correction Section]

Next, the pixel value correction section 230 shown in FIG. 4 will be described in detail.

The pixel value correction section 230 is configured with a blown-out highlight pixel detection section 232, a pixel interpolation section 234 and an interpolation value adjustment section 236.

Figure 5:
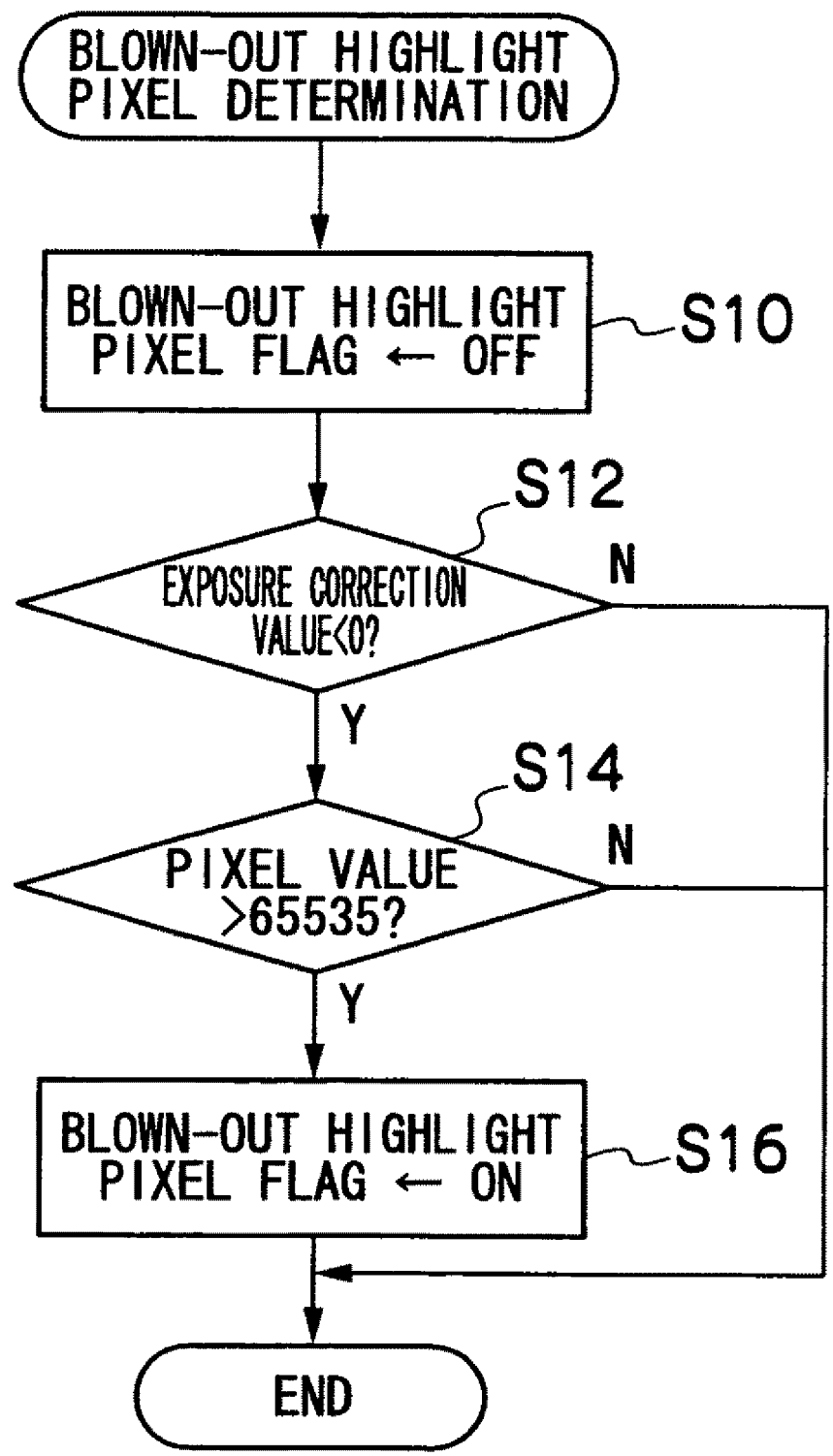
FIG. 5 is a flowchart showing contents of a process in a blown-out highlight pixel detection section shown in FIG. 4.

FIG. 5 is a flowchart showing contents of a process in the blown-out highlight pixel detection section 232.

With respect to each pixel of R, G and B inputted from the WB correction section 220, the pixel detection section 232 detects whether or not the pixel has blown-out highlight. First, a blown-out highlight pixel flag is set to OFF with respect to the inputted pixel (step S10). Here, a pixel value of the pixel having the blown-out highlight pixel flag set to OFF is not corrected, and only a pixel having the blown-out highlight pixel flag set to ON is set as the correction target pixel and its pixel value is corrected.

Subsequently, it is determined whether or not the exposure correction value at the exposure correction section 240 is less than 0 (step S12), and if the exposure correction value <0, the process proceeds to step S14, and if the exposure correction value ≧0, the blown-out highlight pixel flag is still set to OFF and the process with respect to the pixel is completed. It should be noted that, if the exposure correction value ≧0, since the sensitization process is performed and a color is not attached to a blown-out highlight portion, the pixel value is not corrected.

At step S14, it is determined whether or not the pixel is larger than 65535 ($=2^{16}-1$). Here, 65535 is a maximum value of the 16-bit R, G and B data, and a pixel larger than this value is a pixel in which the pixel value is saturated without being subjected to the desensitization process (a pixel which is blown-out highlight).

Next, with respect to the pixel having the pixel value of >65535, the blown-out highlight pixel flag is set to ON (step S16), and with respect to the pixel having the pixel value of ≦65535, the blown-out highlight pixel flag is still set to OFF, and the determination with respect to the pixel is completed.

According to the above described process, with respect to all pixels of R, G and B, it is determined whether or not there is the blown-out highlight pixel, and with respect to the pixel detected as the blown-out highlight pixel, the blown-out highlight pixel flag is set to ON.

It should be noted that, in this example, although a criterion value for the determination has been 65535 which is a maximum output value of 16-bit length, a maximum output value of 8-bit length is 255 and a maximum output value of 24-bit length is 1048575. Therefore, the criterion value for the determination is changed depending on a maximum color representable value at that time.

Figure 6A:
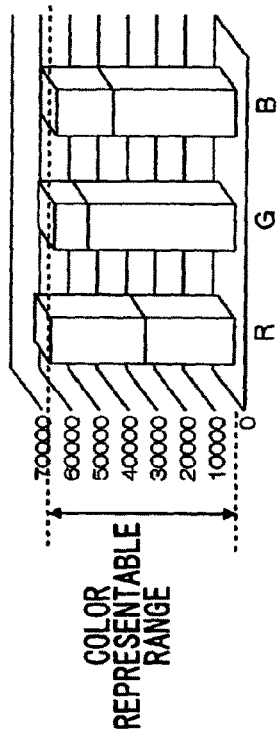
FIGS. 6A and 6B are diagrams showing an example of a pixel which has blown out highlight as a result of white balance correction with respect to RAW data.
Figure 6B:
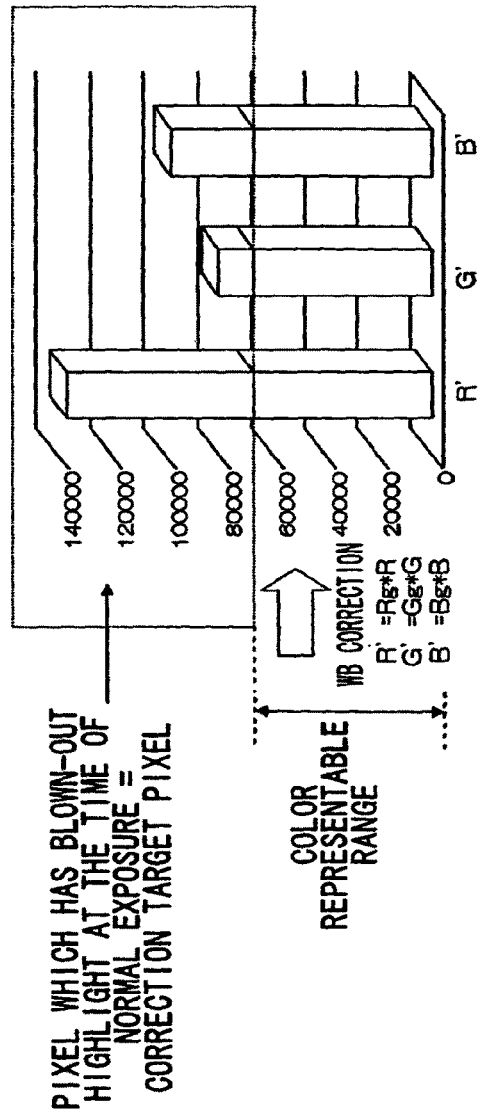

FIGS. 6A and 6B are diagrams showing an example of a pixel which has blown-out highlight as a result of the white balance correction. FIG. 6A shows the R, G and B data of one pixel before the white balance correction, and FIG. 6B shows that the R, G and B data of the above described blown-out highlight pixel due to the white balance correction.

In the example shown in FIGS. 6A and 6B, the white balance correction has been performed with the gain values Rg, Gg and Bg corresponding to the sunlight (Rg>Bg>Gg). Each of the R, G and B data before the white balance correction as shown in FIG. 6A has the pixel value less than or equal to the maximum output value (=65535) (each pixel is not blown-out highlight). However, as a result of multiplying the R, G and B data by the gain values Rg, Gg and Bg respectively in the white balance correction, each pixel has become the blown-out highlight pixel having the pixel value larger than the maximum output value as shown in FIG. 6B.

Among the R, G and B data shown in FIG. 6B, data in a range surrounded by a dotted line shows blown-out amounts. These blown-out amounts are not necessarily uniform for each of R, G and B, and in the example shown in FIG. 6B, the blown-out amount of R is largest, the blown-out amount of B is second largest, and the blown-out amount of G is smallest.

When the exposure correction section 240 to which this R, G and B data subjected to the white balance correction is inputted gradually increases the number of levels of the desensitization process of correcting the exposure to be underexposed, the pixel values of R, G and B are reduced at a constant rate, respectively. First, the pixel value of G becomes less than or equal to the maximum output value (=65535), and next the pixel value of B becomes less than or equal to the maximum output value, and finally the pixel value of R becomes less than or equal to the maximum output value. Thereby, there is a problem that, in a state where the pixel value of R is the maximum output value, the pixel values of G and B become less than the maximum output value and the color is attached to the blown-out highlight portion (in this case, since the pixel value of R is large, the color attachment becomes pink).

First Embodiment

According to the present invention, in order to prevent the color attachment at the time of the desensitization process with respect to this blown-out highlight portion, the pixel value of the pixel determined as the blown-out highlight pixel (the correction target pixel having the blown-out highlight pixel flag set to ON) is corrected to a maximum pixel value among the pixel value of the correction target pixel and pixel values of other color pixels surrounding the correction target pixel, in a first embodiment of the present invention.

Figure 7A:
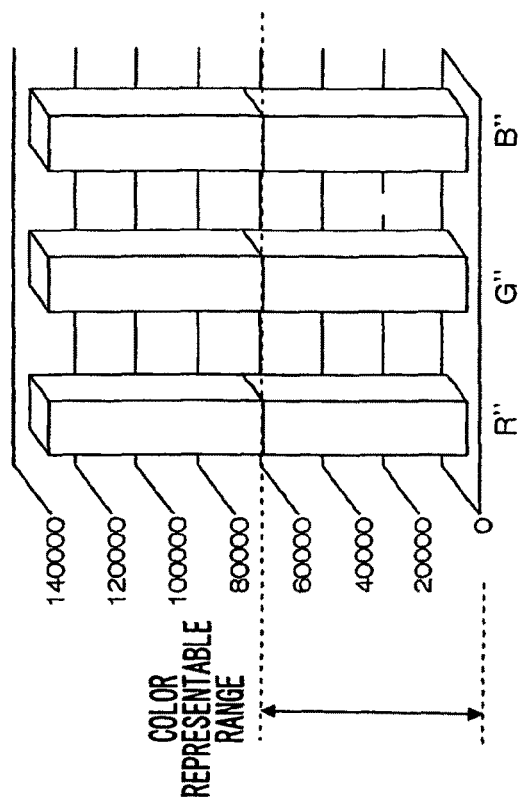
FIGS. 7A and 7B are diagrams used for describing correction of a pixel value of a correction target pixel according to an embodiment of the present invention.
Figure 7B:
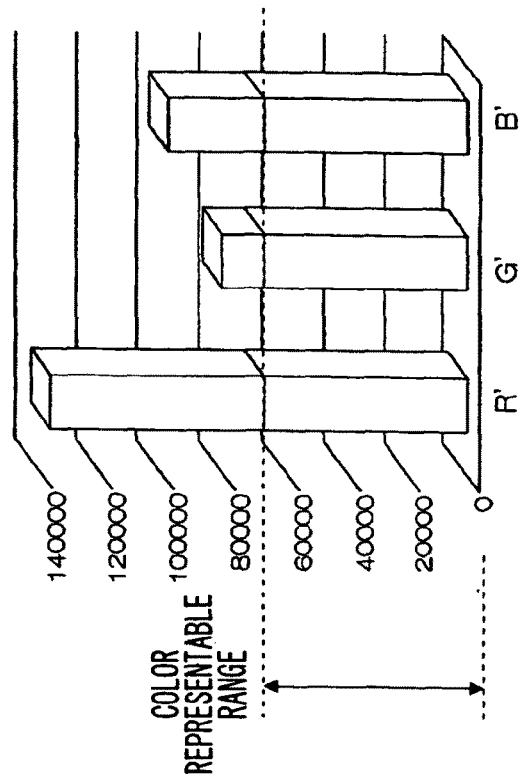

FIG. 7A shows the R, G and B data subjected to the white balance correction shown in FIG. 6B, and FIG. 7B shows the R, G and B data in the case of being corrected by the pixel value correction section 230.

As shown in FIGS. 7A and 7B, if the correction target pixel is the R pixel, the pixel value (R') is not corrected (R'=R"), and if the correction target pixel is the G pixel or the B pixel, the pixel value (G' or B') is corrected to a pixel value (G" or B") matching the pixel value (R") of the R pixels surrounding the pixel.

Since the pixel value of the pixel at the blown-out highlight portion is corrected in this way, subsequently, even if the exposure correction section 240 gradually increases the number of levels of the desensitization process, it is possible to prevent the color attachment with respect to the blown-out highlight portion and also increase a width (the number of levels) in which desensitization correction can be performed.

FIG. 8A shows the R, G and B data subjected to the white balance correction corresponding to the light source of the tungsten bulb, and FIG. 8B shows the R, G and B data in the case of being corrected by the pixel value correction section 230.

Gain values Rg, Gg and Bg corresponding to the light source of the tungsten bulb have a relationship of Bg>Gg>Rg, and in an example shown in FIG. 8A, the pixel values (R', G' and B') of the R, G and B after the white balance correction have become B'>G'>R'.

Therefore, in this case, as shown in FIG. 5B, if the correction target pixel is the B pixel, the pixel value (B') is not corrected (B'=B"), and if the correction target pixel is the R pixel or the G pixel, the pixel value (R' or G') is corrected to a pixel value (R" or G") matching the pixel value (B") of the B pixel surrounding the pixel.

Second Embodiment

Next, a second embodiment of the present invention which prevents the color attachment at the time of the desensitization process with respect to the blown-out highlight portion will be described.

<Maximum Interpolation Value Determination>

The pixel interpolation section 234 of the pixel value correction section 230 (FIG. 4) determines a maximum interpolation value as shown below.

FIG. 9 is a flowchart showing a method of determining the maximum interpolation value.

First, it is determined which pixel among pixels of a first color, a second color and a third color the pixel having the blown-out highlight pixel flag set to ON (the correction target pixel) corresponds to (steps S20 and S22).

Here, with respect to the pixels of the first color, the second color and the third color, a pixel of a color multiplied by a largest gain value among the gain values Rg, Gg and Bg used by the WB correction section 220 is referred to as the pixel of the first color, a pixel of a color multiplied by a second largest gain value is referred to as the pixel of the second color, and a pixel of a color multiplied by a third largest gain value (smallest gain value) is referred to as the pixel of the third color.

Next, if the correction target pixel is the pixel of the first color, an inputted pixel value (input value) thereof is set as the maximum interpolation value with respect to the pixel value of the pixel (step S24).

If the correction target pixel is the pixel of the second color, a pixel value to be referred to is obtained from the pixel value of the pixel of the first color adjacent to the correction target pixel (step S26).

Figure 10A:
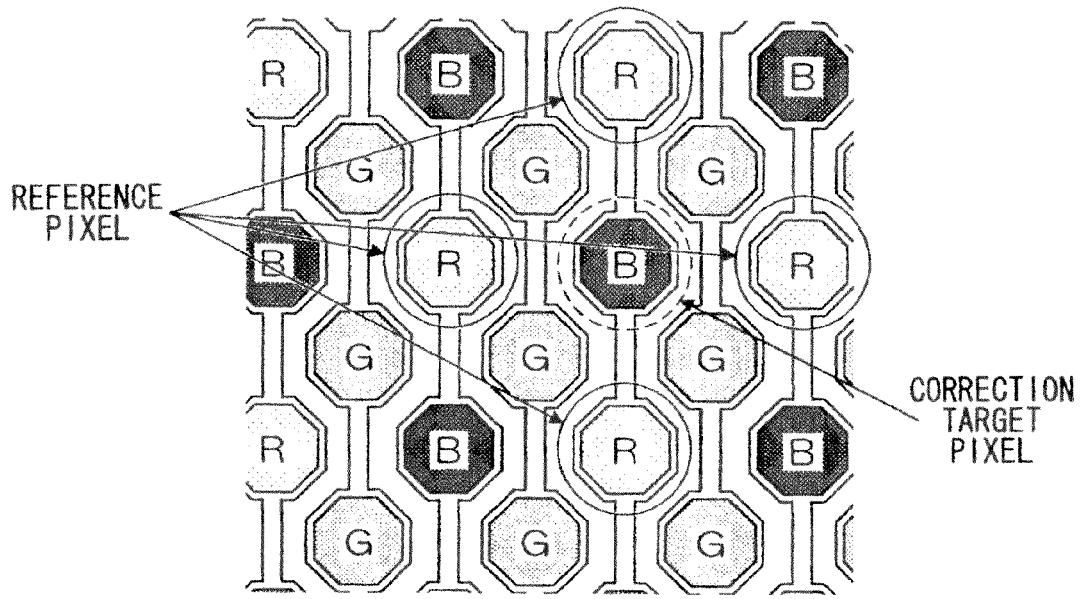
FIGS. 10A and 10B are diagrams used for describing reference pixels with respect to the correction target pixel.
Figure 10B:
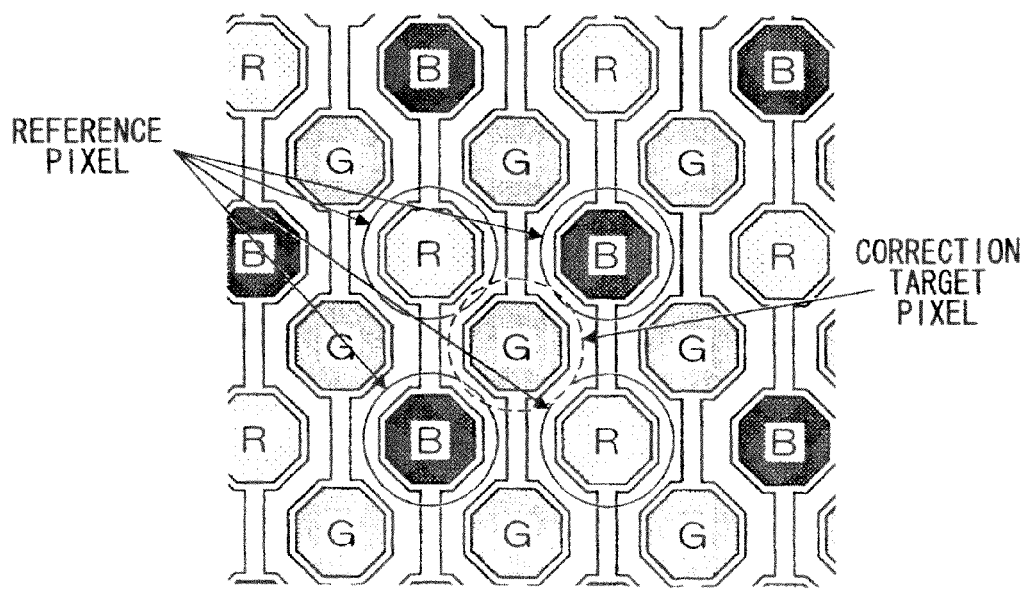

FIGS. 10A and 10B show a substantial part of the CCD 24 shown in FIG. 2. Now as shown in FIG. 10A, if the correction target pixel is the B pixel and the pixel value of the B pixel is obtained with a pixel of another color (R) adjacent to this B pixel as a reference pixel, an average value of pixel values of four R pixels surrounding the B pixel is obtained and this average value is set as the pixel value to be referred to.

Similarly, as shown in FIG. 10B, if the correction target pixel is the G pixel and the pixel value of the G pixel is obtained with pixels of other colors (R and B) adjacent to this G pixel as the reference pixels, an average value of pixel values of two R pixels surrounding the G pixel and an average value of pixel values of two B pixels surrounding the G pixel are obtained, and these average values are set as the pixel values to be referred to.

Next, based on the pixel value of the reference pixel obtained at step S26, and the gain values with respect to the pixels of the first color and the second color, the maximum interpolation value for the pixel of the second color is calculated (step S28).

For example, when the pixel value obtained with reference to the pixel value R of the first color (R) is Rave, and a ratio of the gain value Rg of the first color (R) to the gain value Bg of the second color (B) which have been applied at the time of the white balance correction is (Rg/Bg), a maximum interpolation value B" for the B pixel of the second color is calculated by the next formula.

$$B'' = Rave * (Rg/Bg) \quad \text{[Formula 1]}$$

Moreover, if the correction target pixel is the pixel of the third color, the pixel values to be referred to are obtained from the pixel values of the pixel of the first color and the pixel of the second color which are adjacent to the correction target pixel (step S30). For example, if the third color is the G pixel, the first color is the R pixel and the second color is the B pixel, the pixel values to be referred to, Rave and Bave, are obtained from the pixel values of the pixels of the first color and the pixels of the second color surrounding the correction target pixel respectively, similarly to the above description.

Next, based on the pixel values to be referred to of the first color and the second color obtained at step S30, and the gain values Rg, Gg and Bg applied at the time of the white balance correction, the maximum interpolation value for the pixel of the third color is calculated (step S32).

For example, when the pixel value obtained with reference to the pixel value R of the first color (R) is Rave, the pixel value obtained with reference to the pixel value B of the second color (B) is Bave, the ratio of the gain value Rg of the first color (R) to the gain value Bg of the second color (B) which have been applied at the time of the white balance correction is (Rg/Bg), and a ratio of the gain value Bg of the second color (B) to the gain value Gg of the third color (G) which have been applied at the time of the white balance correction is (Bg/Gg), a maximum interpolation value G″ for the G pixel of the third color is calculated by the next formula.

$$G''=\alpha*Gtmp1+\beta*Gtmp2 \quad \text{[Formula 2]}$$

Where Gtmp1=Rave*(Rg/Bg)
Gtmp2=Bave*(Bg/Gg)
α+β=1.0

It should be noted that, in this example, although the pixel value to be referred to has been the value obtained by averaging the pixel values of multiple pixels of the same color surrounding the correction target pixel, the pixel value to be referred to is not limited thereto and a maximum value among the pixel values of the multiple pixels may be the reference pixel value. Moreover, if the maximum interpolation values obtained with respect to the correction target pixels of the second color and the third color as described above become less than or equal to the pixel value of the correction target pixel, the correction target pixel is excluded from the correction target pixels.

<Interpolation Value Adjustment Process>

The interpolation value adjustment section 236 of the pixel value correction section 230 (FIG. 4) calculates an interpolation value as shown below based on the pixel value, the maximum interpolation value and the like of the correction target pixel, and outputs the calculated interpolation value instead of the pixel value of the correction target pixel to the exposure correction section 240.

Figure 11:
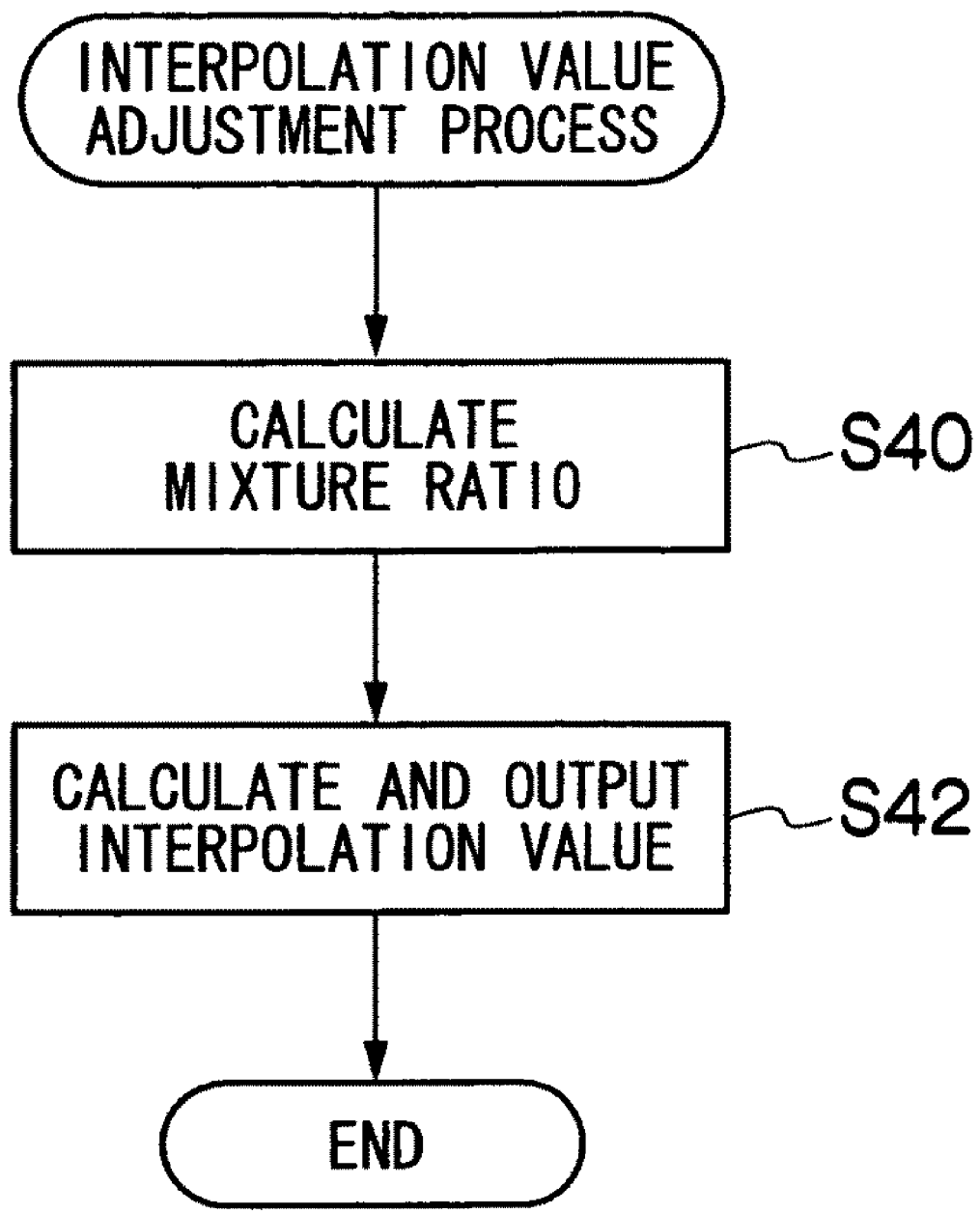
FIG. 11 is a flowchart showing a processing method in an interpolation value adjustment section shown in FIG. 4.

FIG. 11 is a flowchart showing a processing method in the interpolation value adjustment section 236.

First, a mixture ratio of the pixel value of the correction target pixel to the maximum interpolation value (FIG. 9) obtained with respect to the correction target pixel is calculated (step S40).

Figure 12:
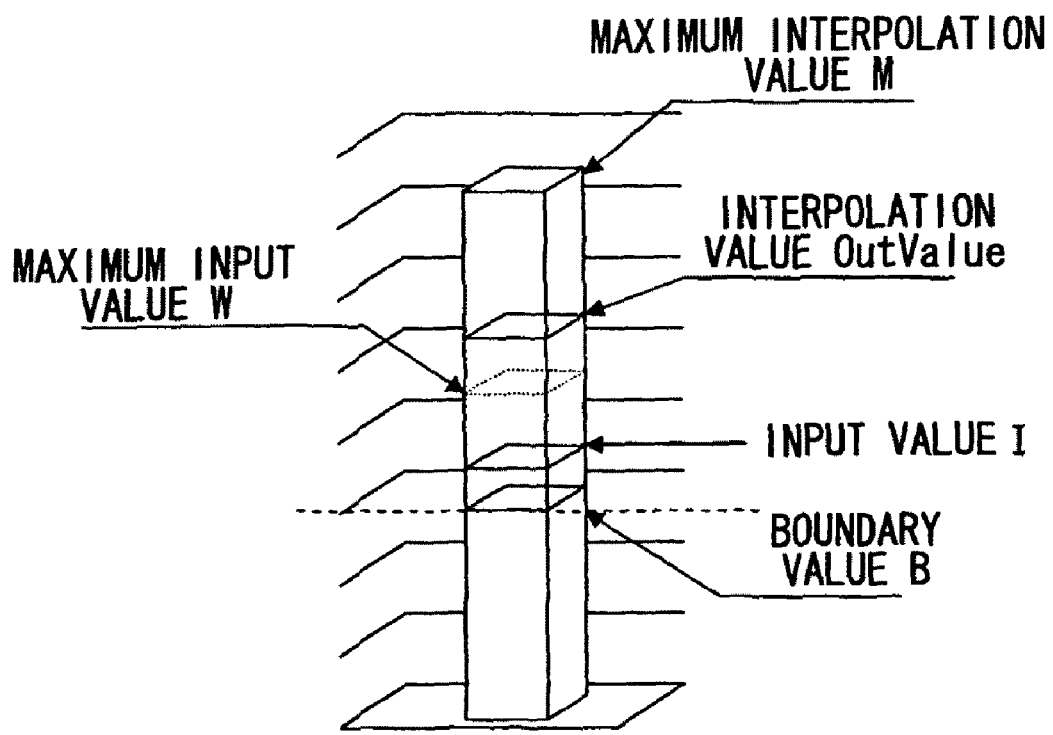
FIG. 12 is a diagram used for describing a mixture ratio for calculating an interpolation value.

As shown in FIG. 12, with respect to the correction target pixel, when the pixel value (input value) is I, the maximum output value (boundary value) is B, and a value obtained when the white balance correction is executed with respect to the maximum output value (maximum input value) is W, the above described mixture ratio ExRatio is calculated by the next formula.

$$\text{ExRatio}(0.0 \text{ to } 1.0)=\{(I-B)/(W-B)\}^2 \quad \text{[Formula 3]}$$

Next, when the maximum interpolation value obtained with respect to the correction target pixel (see FIG. 9) is M, based on the pixel value (input value I) of the correction target pixel and the mixture ratio ExRatio obtained by the above described [Formula 3], an interpolation value OutValue is calculated by the next formula (step S42).

$$\text{Interpolation value OutValue}=I*(1-\text{ExRatio})+M*\text{ExRatio} \quad \text{[Formula 4]}$$

As is also apparent from the above described [Formula 3] and [Formula 4], the larger the input value I is (the more the input value I approaches to the maximum input value W), the more the mixture ratio ExRatio approaches to 1 and the more the interpolation value OutValue approaches to the maximum interpolation value M.

In this way, it is possible to avoid undesirable blown-out of tone at the time of the desensitization process and obtain natural colors by adjusting the interpolation value depending on the pixel value of the correction target pixel.

Figure 13B:
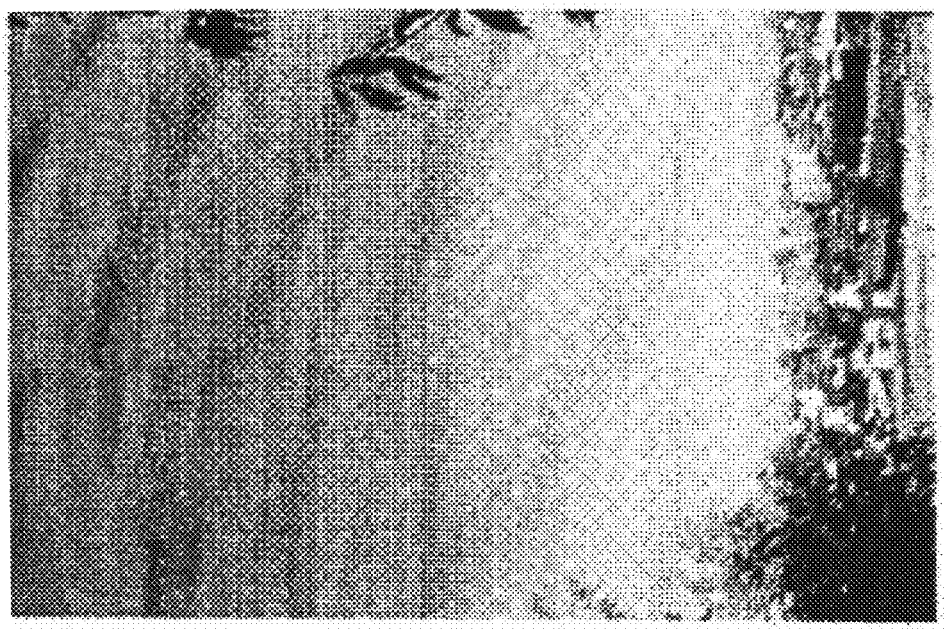
FIGS. 13A and 13B are diagrams used for describing an image restored by correcting the pixel value of the correction target pixel to the interpolation value.
Figure 13A:
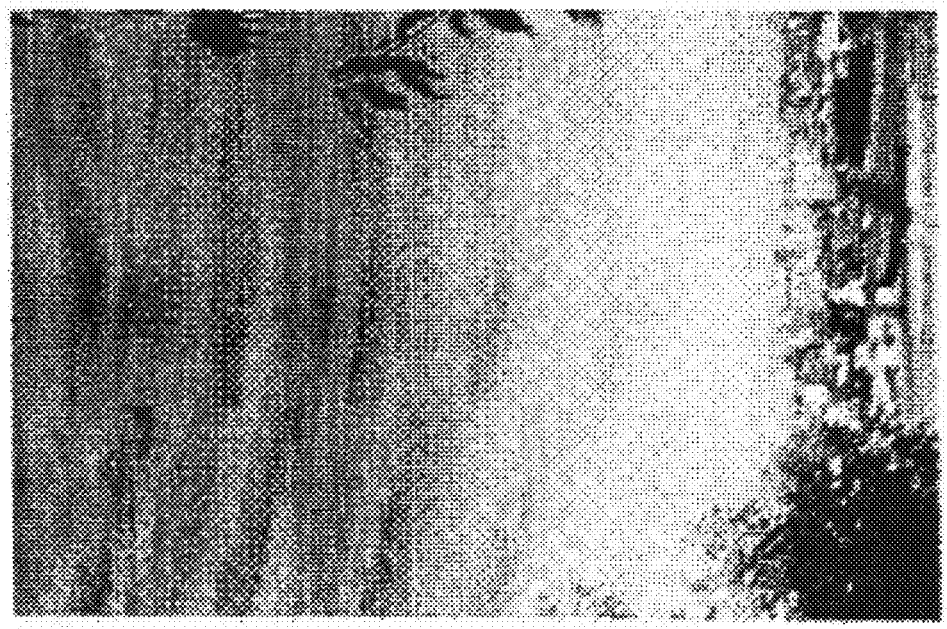

FIGS. 13A and 13B show an image in the case of not being adjusted with the interpolation value as described above, and an image in the case of being adjusted with the interpolation value, respectively.

In the image shown in FIG. 13A, the blown-out tone (difference in level) occurs in gradation at a portion such as sky where highlight is blown-out. However, the image shown in FIG. 13B becomes an image in which the gradation varies delicately.

It should be noted that the maximum interpolation value is not limited to the case of being obtained by [Formula 1] and [Formula 2], and for example, the maximum interpolation value may match the input value of the first color. Moreover, the mixture ratio ExRatio may be any value in which the interpolation value can be adjusted depending on the pixel value of the correction target pixel, and is not limited to the value shown in [Formula 3].

Third Embodiment

FIG. 14 is a flowchart showing a third embodiment of the image processing method according to the present invention.

MaxGain, which is the gain value of the pixel of the first color among the gain values Rg, Gg and Bg which are currently set in the WB correction section 220 (FIG. 4), is obtained (step S50).

For example, if the white balance correction has been performed with the gain values Rg, Gg and Bg corresponding to the sunlight (Rg>Bg>Gg), the gain value Gg is set as MaxGain.

Next, when a maximum exposure correction value in which information can be restored is MaxEV, the exposure correction value MaxEV is calculated by the next formula based on the above described MaxGain (step S52).

$$\text{MaxEV}=\text{LOG}_2(1/\text{MaxGain}) \quad \text{[Formula 5]}$$

Next, a relationship between the above described calculated maximum exposure correction value MaxEV in which the information can be restored, and the exposure correction value which is currently set, is visibly displayed on the monitor device 120 of the personal computer 100 (step S54).

FIG. 15 shows an example of an operation screen displayed on the monitor device 120 when the exposure correction is manually set.

In the example shown in FIG. 15, in the case of a configuration in which the exposure can be corrected to be underexposed to −3 EV (desensitization process), on a bar graph 140 having a length of +−0 to −3 EV, an exposure range in which the information can be restored is displayed in a white color based on the exposure correction value MaxEV obtained by [Formula 5], and a range from the exposure correction value MaxEV to −3 EV is displayed in a gray color.

This screen shows that, when the exposure correction value is set within the range of the gray color, the information is not restored and a luminance value at the blown-out highlight portion changes to the gray color. Moreover, in the exposure correction in a range beyond 0 EV in a plus direction, since the luminance value is increased and the information is not restored, nothing is displayed.

On the other hand, the exposure correction value which is currently set is displayed in a numerical value (−1.3). It should be noted that, when a scale or an index showing the current exposure correction value is added on the bar graph 140, it is possible to display a corresponding relationship between the exposure range in which the information can be restored and the current exposure correction value in a more easily understood manner.

An operator can operate an up/down button 142 or a slide tab 144 to set the exposure correction value to an appropriate value, and at this time, the operator can operate while checking the above described exposure range in which the information can be restored (the white color range on the bar graph 140), which improves operability.

Fourth Embodiment

FIG. 16 is a flowchart showing a fourth embodiment of the image processing method according to the present invention.

If the RAW development is performed with the RAW data, it becomes possible to select whether to up a dynamic range (D range) and perform development, or to perform normal development.

At step S60, it is determined whether or not the development with the D range-up has been selected, and if the development has been selected, the process proceeds to step S62, and if the development has not been selected, the process proceeds to step S68.

At step S62, the above described process of correcting the pixel value of the blown-out highlight pixel to the interpolation value is performed. Subsequently, at step S64, the maximum exposure correction value MaxEV which enables information restoration is obtained (see [Formula 5]), and the desensitization process is performed with this exposure correction value MaxEV.

Figure 17A:
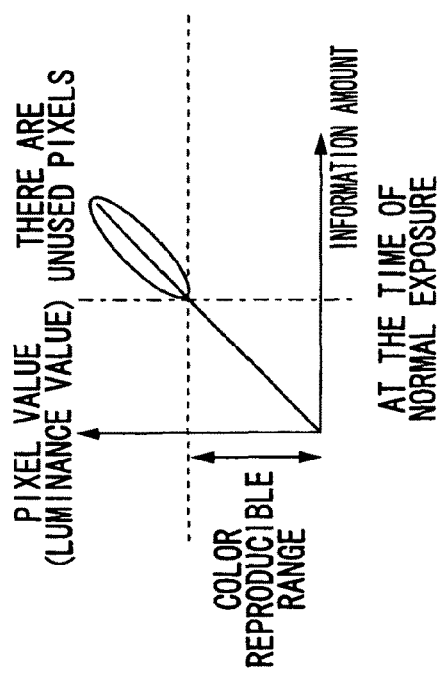
FIGS. 17A, 17B and 17C are diagrams used for describing RAW data development in a wide dynamic range.
Figure 17B:
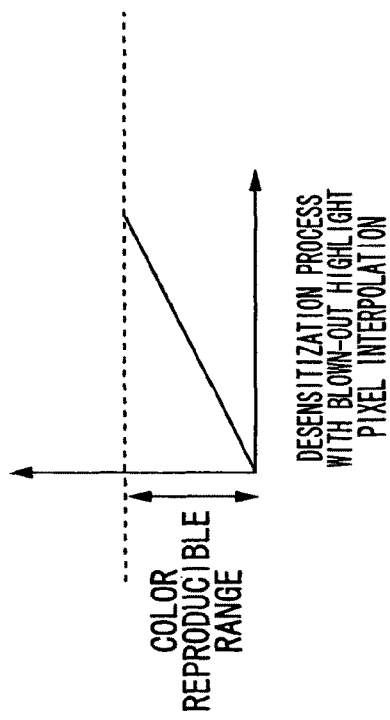

FIG. 17A shows a relationship between an information amount and the pixel value of the RAW data subjected to the white balance correction. According to the desensitization process at the above described step S64, as shown in FIG. 17B, the whole information amount of the RAW data subjected to the white balance correction can be put in a color reproducible range (within the maximum output value). However, since the desensitization process has been performed, the image has become dark.

At step S66, a γ2 curve, which is different from a gamma curve at the time of the normal exposure (γ1 curve), is set in the gamma correction section 250 (see FIG. 4), and the gamma correction section 250 is caused to perform the gamma correction with this γ2 curve.

Figure 17C:
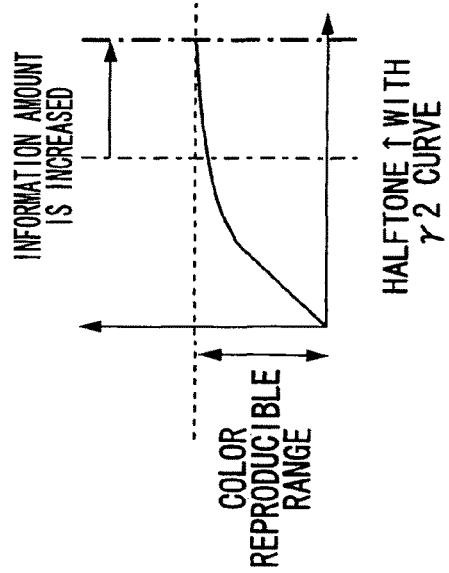

The γ2 curve has a tone correction property which makes the image which has become dark due to the desensitization process brighter. As shown in FIG. 17C, the gamma correction section 250 in which the γ2 curve has been set performs tone correction so that a halftone becomes larger than the halftone in normal gamma correction, and also performs the tone correction so that a high luminance portion is compressed. Thereby, the D range is upped, the information at the high luminance portion, which is not used at the normal exposure, can be restored, and also an image which is appropriately bright can be obtained.

In addition, it is preferable to have prepared several kinds of γ2 curves depending on the maximum exposure correction value MaxEV, and select an optimal γ2 curve depending on the maximum exposure correction value MaxEV.

On the other hand, at step S60, if it is determined that the development with the D range-up has not been selected (the normal development has been selected), the γ1 curve for the normal development is set in the gamma correction section 250, and the gamma correction section 250 is caused to perform the gamma correction with this γ1 curve (step S68).

In this case, the information on the pixel beyond the color reproducible range shown in FIG. 17A becomes the blown-out highlight portion, and the information thereof is lost.

It should be noted that, although the image processing method when the RAW development is performed with respect to the data in the RAW file by software according to the image processing program installed in the personal computer 100 has been described in the embodiments, this image processing method can also be similarly applied to a case of performing the RAW development with respect to the data in the RAW file by hardware in the digital signal processing section 30 of the camera 1.

What is claimed is:

1. An image processing method, comprising:
   an input step of inputting a color digital image;
   a white balance correction step of correcting white balance of the inputted digital image;
   an exposure correction step of correcting exposure of the digital image having the corrected white balance;
   a determination step of determining a pixel in which an output pixel value is saturated without being corrected to be underexposed by the exposure correction, among respective pixels in the digital image having the corrected white balance; and
   a pixel value correction step of setting the pixel determined to be saturated as a correction target pixel and correcting the pixel value of the correction target pixel to be more than or equal to the pixel value.

2. The image processing method according to claim 1, wherein if an exposure correction value at the exposure correction step is more than or equal to 0, the pixel value of the correction target pixel is not corrected by the pixel value correction step.

3. The image processing method according to claim 1, wherein
   at the pixel value correction step, the pixel value of the correction target pixel is corrected to a maximum pixel value among the pixel value of the correction target pixel and pixel values of different color pixels surrounding the correction target pixel.

4. The image processing method according to claim 3, wherein if an exposure correction value at the exposure correction step is more than or equal to 0, the pixel value of the correction target pixel is not corrected by the pixel value correction step.

5. The image processing method according to claim 1, wherein
   the pixel value correction step comprises: a step of obtaining, with respect to the pixel value of the correction target pixel, a maximum interpolation value which is more than or equal to the pixel value; and an interpolation process step of performing an interpolation process with respect to the pixel value of the correction target pixel and the maximum interpolation value to calculate an interpolation value, and the pixel value of the correction target pixel is corrected to the calculated interpolation value.

6. The image processing method according to claim 5, wherein if an exposure correction value at the exposure correction step is more than or equal to 0, the pixel value of the correction target pixel is not corrected by the pixel value correction step.

7. The image processing method according to claim 5, wherein at the step of obtaining the maximum interpolation value, the maximum interpolation value is obtained with reference to pixel values of different color pixels surrounding the correction target pixel.

8. The image processing method according to claim 5, wherein a pixel in the digital image of a color corresponding to a maximum gain value among gain values of R, G and B to be used in the white balance correction at the white balance correction step is set as a pixel of a first color, a pixel in the digital image of a color corresponding to a second largest gain value is set as a pixel of a second color, and a pixel in the digital image of a color corresponding to a smallest gain value is set as a pixel of a third color, and wherein at the step of obtaining the maximum interpolation value, with respect to the pixel of the first color, the pixel value of the pixel of the first color is obtained as the maximum interpolation value, and with respect to the pixel of the second color, the maximum interpolation value is obtained with reference to the pixel values of the pixels of the first color surrounding the pixel of the second color, and with respect to the pixel of the third color, the maximum interpolation value is obtained with reference to the pixel values of the pixels of the first color and the second color surrounding the pixel of the third color, respectively.

9. The image processing method according to claim 5, wherein at the interpolation process step, the interpolation value is calculated, by the interpolation process, to be closer to the maximum interpolation value obtained with respect to the correction target pixel as the pixel value of the pixel is larger.

10. The image processing method according to claim 7, wherein if an exposure correction value at the exposure correction step is more than or equal to 0, the pixel value of the correction target pixel is not corrected by the pixel value correction step.

11. An image processing method, comprising:
an input step of inputting a color digital image;
a white balance correction step of correcting white balance of the inputted digital image;
an exposure correction step of correcting exposure of the digital image having the corrected white balance, depending on an exposure correction value which has been manually set;
a step of calculating a maximum exposure correction value which enables information restoration, at the time of the exposure correction at the exposure correction step, based on gain values of R, G and B used in the white balance correction at the white balance correction step; and
a step of visibly displaying a relationship between the maximum exposure correction value and the exposure correction value which is currently set, on a display device.

12. The image processing method according to claim 11, wherein when the maximum value among the gain values of R, G and B used in the white balance correction is MaxGain, the step of calculating the maximum exposure correction value calculates a maximum exposure correction value MaxEV which enables the information restoration, by a next formula:

$$\text{Max}EV=\text{LOG}_2(1/\text{MaxGain}).$$

13. The image processing method according to claim 11, further comprising:

a determination step of determining a pixel whose output pixel value is saturated without being corrected to be underexposed by the exposure correction, among respective pixels in the digital image having the corrected white balance; and a pixel value correction step of setting the determined pixel whose pixel value is saturated as a correction target pixel and correcting the pixel value of the correction target pixel to be more than or equal to the pixel value.

14. An image processing method, comprising:
an input step of inputting a color digital image;
a white balance correction step of correcting white balance of the inputted digital image;
an exposure correction step of correcting exposure of the digital image having the corrected white balance to be underexposed so that the digital image having the corrected white balance is not saturated; and
a gamma correction step of performing gamma correction for a wide dynamic range with respect to the digital image corrected to be underexposed, in which tone correction is performed to make a halftone larger than the halftone in normal gamma correction and also the tone correction is performed to compress a high luminance portion.

15. The image processing method according to claim 14, wherein the exposure correction step comprises a step of calculating a maximum exposure correction value which enables information restoration, for the digital image having the corrected white balance, based on a maximum value among gain values of R, G and B used in the white balance correction, and the exposure of the digital image having the corrected white balance is corrected depending on this maximum exposure correction value.

16. The image processing method according to claim 15, wherein when the maximum value among the gain values of R, G and B used in the white balance correction is MaxGain, the step of calculating the maximum exposure correction value calculates a maximum exposure correction value MaxEV which enables the information restoration, by a next formula:

$$\text{Max}EV=\text{LOG}_2(1/\text{MaxGain}).$$

17. The image processing method according to claim 14, further comprising:

a determination step of determining a pixel whose output pixel value is saturated without being corrected to be underexposed by the exposure correction, among respective pixels in the digital image having the corrected white balance; and a pixel value correction step of setting the pixel whose pixel value is determined to be saturated as a correction target pixel and correcting the pixel value of the correction target pixel to be more than or equal to the pixel value.

18. An image processing apparatus, comprising:
an input device which inputs a color digital image;
a white balance correction device which corrects white balance of the inputted digital image;
an exposure correction device which corrects exposure of the digital image having the corrected white balance;
a determination device which determines a pixel whose output pixel value is saturated without being corrected to be underexposed by the exposure correction, among respective pixels in the digital image having the corrected white balance; and
a pixel value correction device which sets the pixel whose pixel value is determined to be saturated as a correction target pixel and corrects the pixel value of the correction target pixel to be more than or equal to the pixel value.

19. An imaging apparatus, comprising:
an imaging device which images a subject and obtains RAW data showing a color digital image;
a recording device which has a function of recording at least the RAW data in a recording medium; and
an image processing apparatus according to claim 18,
wherein the input device inputs the digital image showing the RAW data obtained by the imaging device or the digital image showing the RAW data read from the recording medium.

20. An image processing apparatus, comprising:
an input device which inputs a color digital image;
a white balance correction device which corrects white balance of the inputted digital image;
an exposure correction device which corrects exposure of the digital image having the corrected white balance, depending on an exposure correction value which has been manually set;
a device which calculates a maximum exposure correction value which enables information restoration, at the time of the exposure correction at the exposure correction device, based on gain values of R, G and B used in the white balance correction at the white balance correction device; and
a device which visibly displays a relationship between the maximum exposure correction value and the exposure correction value which is currently set, on a display device.

21. An imaging apparatus, comprising:
an imaging device which images a subject and obtains RAW data showing a color digital image;
a recording device which has a function of recording at least the RAW data in a recording medium; and
an image processing apparatus according to claim 20,
wherein the input device inputs the digital image showing the RAW data obtained by the imaging device or the digital image showing the RAW data read from the recording medium.

22. An image processing apparatus, comprising:
an input device which inputs a color digital image;
a white balance correction device which corrects white balance of the inputted digital image;
an exposure correction device which corrects exposure of the digital image having the corrected white balance to be underexposed so that the digital image having the corrected white balance is not saturated; and
a gamma correction device which performs gamma correction for a wide dynamic range with respect to the digital image which has been corrected to be underexposed, in which tone correction is performed to make a halftone larger than the halftone in normal gamma correction and also the tone correction is performed to compress a high luminance portion.

23. An imaging apparatus, comprising:
an imaging device which images a subject and obtains RAW data showing a color digital image;
a recording device which has a function of recording at least the RAW data in a recording medium; and
an image processing apparatus according to claim 22,
wherein the input device inputs the digital image showing the RAW data obtained by the imaging device or the digital image showing the RAW data read from the recording medium.

24. A non-transitory, computer-readable medium storing an image processing program which causes a computer to realize:
an input function of inputting a color digital image;
a white balance correction function of correcting white balance of the inputted digital image;
an exposure correction function of correcting exposure of the digital image having the corrected white balance;
a determination function of determining a pixel whose output pixel value is saturated without being corrected to be underexposed by the exposure correction, among respective pixels in the digital image having the corrected white balance; and
a pixel value correction function of setting the determined pixel whose pixel value is saturated as a correction target pixel and correcting the pixel value of the correction target pixel to be more than or equal to the pixel value.

25. A non-transitory, computer-readable medium storing an image processing program which causes a computer to realize:
an input function of inputting a color digital image;
a white balance correction function of correcting white balance of the inputted digital image;
an exposure correction function of correcting exposure of the digital image having the corrected white balance, depending on an exposure correction value which has been manually set;
a function of calculating a maximum exposure correction value which enables information restoration, at the time of the exposure correction at the exposure correction function, based on gain values of R, G and B used in the white balance correction at the white balance correction function; and
a function of visibly displaying a relationship between the maximum exposure correction value and the exposure correction value which is currently set, on a display device.

26. A non-transitory, computer-readable medium storing an image processing program which causes a computer to realize:
an input function of inputting a color digital image;
a white balance correction function of correcting white balance of the inputted digital image;
an exposure correction function of correcting exposure of the digital image having the corrected white balance to be underexposed so that the digital image having the corrected white balance is not saturated; and
a gamma correction function of performing gamma correction for a wide dynamic range with respect to the digital image corrected to be underexposed, in which tone correction is performed to make a halftone larger than the halftone in normal gamma correction and also the tone correction is performed to compress a high luminance portion.

* * * * *